United States Patent
Fried et al.

(10) Patent No.: US 11,112,503 B2
(45) Date of Patent: Sep. 7, 2021

(54) METHODS AND APPARATUS FOR THREE-DIMENSIONAL (3D) IMAGING

(71) Applicant: Massachusetts Institute of Technology, Cambridge, MA (US)

(72) Inventors: Dale G. Fried, Dover, MA (US); Jonathan P. Frechette, Marlborough, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 632 days.

(21) Appl. No.: 15/880,223

(22) Filed: Jan. 25, 2018

(65) Prior Publication Data
US 2018/0164440 A1 Jun. 14, 2018

Related U.S. Application Data

(63) Continuation of application No. 15/147,854, filed on May 5, 2016, now Pat. No. 9,915,733, which is a
(Continued)

(51) Int. Cl.
*G01S 17/89* (2020.01)
*G01S 17/10* (2020.01)
(Continued)

(52) U.S. Cl.
CPC .............. *G01S 17/89* (2013.01); *G01S 7/481* (2013.01); *G01S 7/4863* (2013.01); *G01S 17/10* (2013.01);
(Continued)

(58) Field of Classification Search
CPC .......... G01S 7/497; G01S 17/10; G01S 17/42; G01S 7/4817; G01S 7/4815; G01S 17/48; G01S 7/4863; G01S 17/66
See application file for complete search history.

(56) References Cited

U.S. PATENT DOCUMENTS

| 4,005,285 A | 1/1977 | Price |
| 4,249,217 A | 2/1981 | Korte et al. |
| (Continued) | | |

OTHER PUBLICATIONS

"Hubble: The Big Telescope (Visible Imagery) (Remote Sensing)", available at: http://what-when-how.com/remote-sensing-from-air-and-space/hubble-the-big-telescope-visible-imagery-remote-sensing/; date captured: May 12, 2016, 11 pages.
(Continued)

*Primary Examiner* — Luke D Ratcliffe
(74) *Attorney, Agent, or Firm* — Smith Baluch LLP

(57) ABSTRACT

A method of imaging a scene includes estimating multiple three-dimensional (3D) representations, each of which corresponds to a respective portion of the scene. Neighboring portions of the scene area are at least partially overlapping. Each 3D representation is estimated by illuminating the respective portion of the scene with a light burst including multiple light pulses, after which multiple point clouds are generated by detecting photons reflected or scattered from the respective portion of the scene using a focal plane array. Data points in the point clouds represent a distance between the focal plane array and a scene point in the respective portion of the scene. The 3D representation is then estimated based on the multiple point clouds via coincidence processing. The method then generates a 3D image of the scene based on the multiple 3D representations.

18 Claims, 16 Drawing Sheets

Related U.S. Application Data continuation of application No. PCT/US2015/046682, filed on Aug. 25, 2015.

(60) Provisional application No. 62/042,303, filed on Aug. 27, 2014, provisional application No. 62/042,321, filed on Aug. 27, 2014, provisional application No. 62/041,713, filed on Aug. 26, 2014, provisional application No. 62/041,755, filed on Aug. 26, 2014.

(51) Int. Cl.
    *G01S 17/42*     (2006.01)
    *G01S 7/481*     (2006.01)
    *G01S 7/4863*     (2020.01)
    *G01S 17/86*     (2020.01)
    *G01S 17/90*     (2020.01)

(52) U.S. Cl.
    CPC .............. *G01S 17/42* (2013.01); *G01S 17/86* (2020.01); *G01S 17/90* (2020.01)

(56) References Cited

U.S. PATENT DOCUMENTS

| | | | |
|---|---|---|---|
| 4,588,382 A | 5/1986 | Peters | |
| 4,739,501 A | 4/1988 | Fussgänger | |
| 4,743,751 A | 5/1988 | Arques et al. | |
| 4,801,194 A | 1/1989 | Agostinelli et al. | |
| 5,485,306 A | 1/1996 | Kiunke et al. | |
| 5,936,759 A | 8/1999 | Büttner | |
| 6,771,310 B1 | 8/2004 | Torita et al. | |
| 7,604,354 B1 | 10/2009 | Ligon | |
| 8,885,883 B2 | 11/2014 | Goodman | |
| 9,915,733 B2 | 3/2018 | Fried et al. | |
| 2010/0188504 A1 | 7/2010 | Dimsdale et al. | |
| 2010/0207936 A1 | 8/2010 | Minear et al. | |
| 2010/0302528 A1* | 12/2010 | Hall | G01S 17/87 356/5.01 |
| 2011/0041266 A1 | 2/2011 | Wyse et al. | |
| 2011/0090337 A1 | 4/2011 | Klomp et al. | |
| 2011/0134220 A1 | 6/2011 | Barbour et al. | |
| 2012/0044476 A1 | 2/2012 | Earhart et al. | |
| 2013/0021447 A1 | 1/2013 | Brisedoux et al. | |
| 2013/0022241 A1 | 1/2013 | Goodman | |
| 2016/0041266 A1* | 2/2016 | Smits | G01S 7/497 356/5.01 |
| 2016/0313445 A1* | 10/2016 | Bailey | G01S 7/4816 |

OTHER PUBLICATIONS

Albota, M. A. et al., "Three-dimensional imaging laser radar with a photon-counting avalanche photodiode array and microchip laser," Applied Optics, vol. 41, No. 36, pp. 7671-7678 (2002).

Aull, B. F. et al., "Geiger-Mode Avalanche Photodiodes for Three-Dimensional Imaging," The Lincoln Laboratory Journal, vol. 13, No. 2, pp. 335-350 (2002).

Beck, J. et al., "A highly sensitive multi-element HgCdTe e-ADP detector for IPDA lidar applications," Proc. of SPIE, vol. 8739, 13 pp. (2013).

Cho, P. et al., "Real-Time 3D Ladar Imaging," Lincoln Laboratory Journal, vol. 16, No. 1, pp. 147-164 (2006).

Extended European Search Report dated Mar. 16, 2018 for European Application No. 15836025.5, 12 pages.

Fang, Q., "2 µm Pulsed Fiber Laser Sources and Their Application in Terahertz Generation," A Dissertation Submitted to the Faculty of the Department of Optical Sciences, University of Arizona, pp. 1-139 (2012).

Farrens, S., "Wafer and Die Bonding Technologies for 3D Integration," Süss MicroTec, MRS Fall 2008 Proceedings E, 11 pages (2008).

Hsu, S. M., "Extracting Target Features from Angle-Angle and Range-Doppler Images," The Lincoln Laboratory Journal, vol. 6, No. 1, pp. 213-227 (1993).

International Search Report and Written Opinion dated Feb. 26, 2016 for International Application No. PCT/US2015/046682, 10 pages.

Jang, J. et al., "Design of Indirect Time-of-Flight Based Lidar for Precise Three-Dimensional Measurement Under Various Reflection Conditions," SensorDevices 2013: The Fourth International Conference on Sensor Device Technologies and Applications, pp. 25-29 (2013).

Jones, K. H. et al., "Reducing Size, Weight, and Power (SwaP) of Perception Systems in Small Autonomous Aerial Systems," 14th AIAA Aviation Technology, Integration, and Operations Conference, AIAA Aviation, pp. 1-9 (Jun. 16-20, 2014).

Keast, C. et al., "Three-Dimensional Integration Technology for Advanced Focal Planes," MRS Proceedings, vol. 1112, pp. 204-206 (2008).

Mastin, A. et al., "Automatic Registration of LIDAR and Optical Images of Urban Scenes," Computer Vision and Pattern Recognition, IEEE Conference, pp. 2639-2646 (2009).

Natarajan, C. M. et al., "Superconducting nanowire single-photon detectors: physics and applications," Superconductor Science and Technology, 25, 063001 (2012).

Niclass, C. et al., "A 100m-range 10-frame/s 340×96-pixel time-of-flight depth sensor in 0.18µm CMOS," 2001 Proceedings of the ESSCIRC, pp. 107-110 (Sep. 2011).

Non-Final Office Action dated Apr. 20, 2017 for U.S. Appl. No. 15/147,854, 7 pages.

Notice of Allowance dated Oct. 24, 2017 for U.S. Appl. No. 15/147,854, 5 pages.

O'Brien, M. et al., "Simulation of 3D Laser Radar Systems," Lincoln Laboratory Journal, vol. 15, No. 1, pp. 37-60 (2005).

Otepka, J. et al., "Georeferenced Point Clouds: A Survey of Features and Point Cloud Management," ISPRS Int. J. Geo-Inf. 2, pp. 1038-1065 (2013).

Pfennigbauer, M. et al., "Multi-Wavelength Airborne Laser Scanning," ILMF, 10 pages (Feb. 7-9, 2011).

Razenkov, I., "Characterization of a Geiger-Mode Avalanche Photodiode Detector for High Spectral Resolution Lidar," A Thesis Submitted to University of Wisconsin-Madison, 88 pages (2010).

Tech Notes "Digital Focal Plane Arrays," Lincoln Laboratory, Massachusetts Institute of Technology, 2 pages (2010).

Wehr, A. et al., "Airborne laser scanning—an introduction and overview," ISPRS Journal of Photogrammetry & Remote Sensing 54, pp. 68-82 (1999).

\* cited by examiner

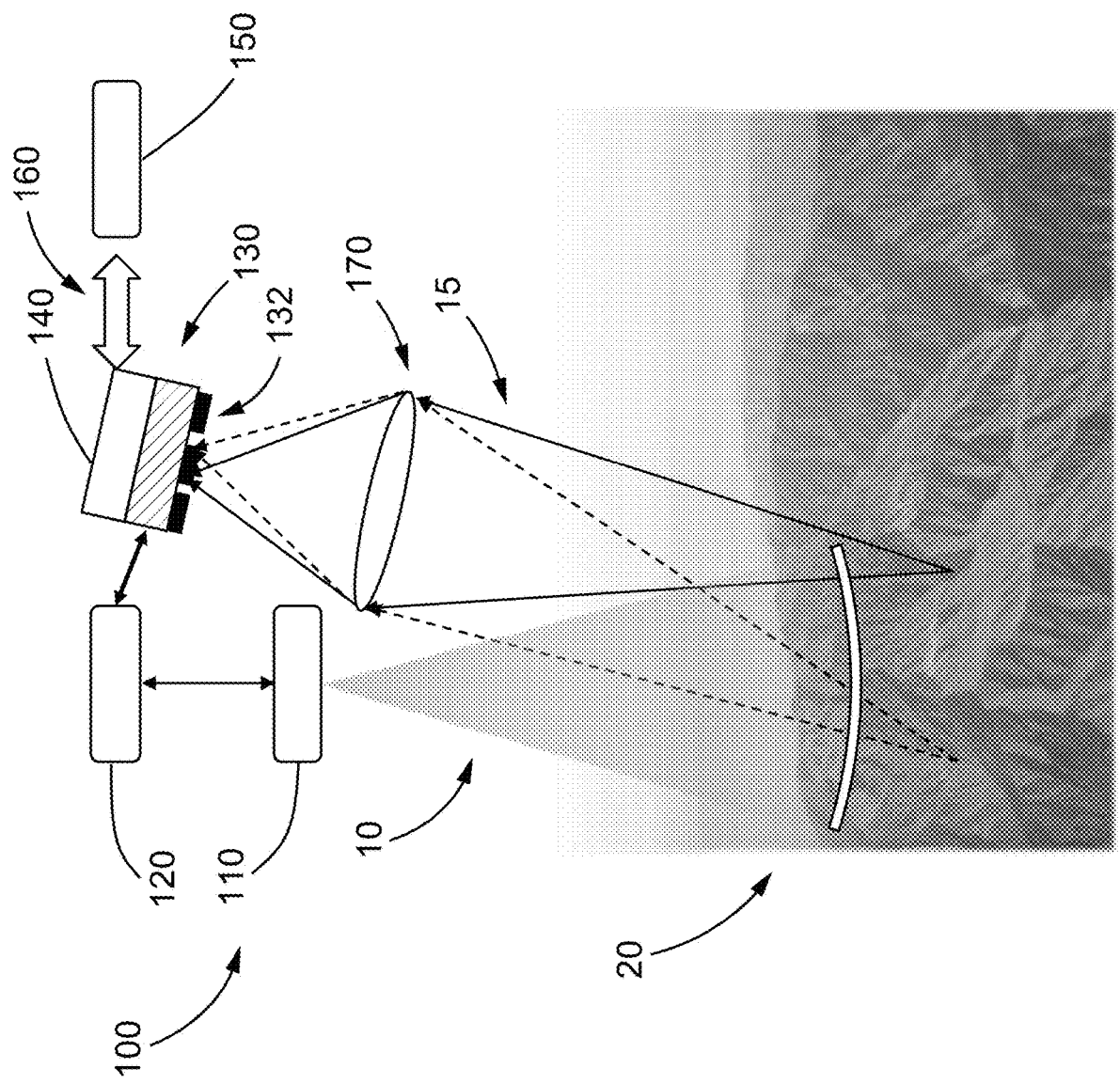

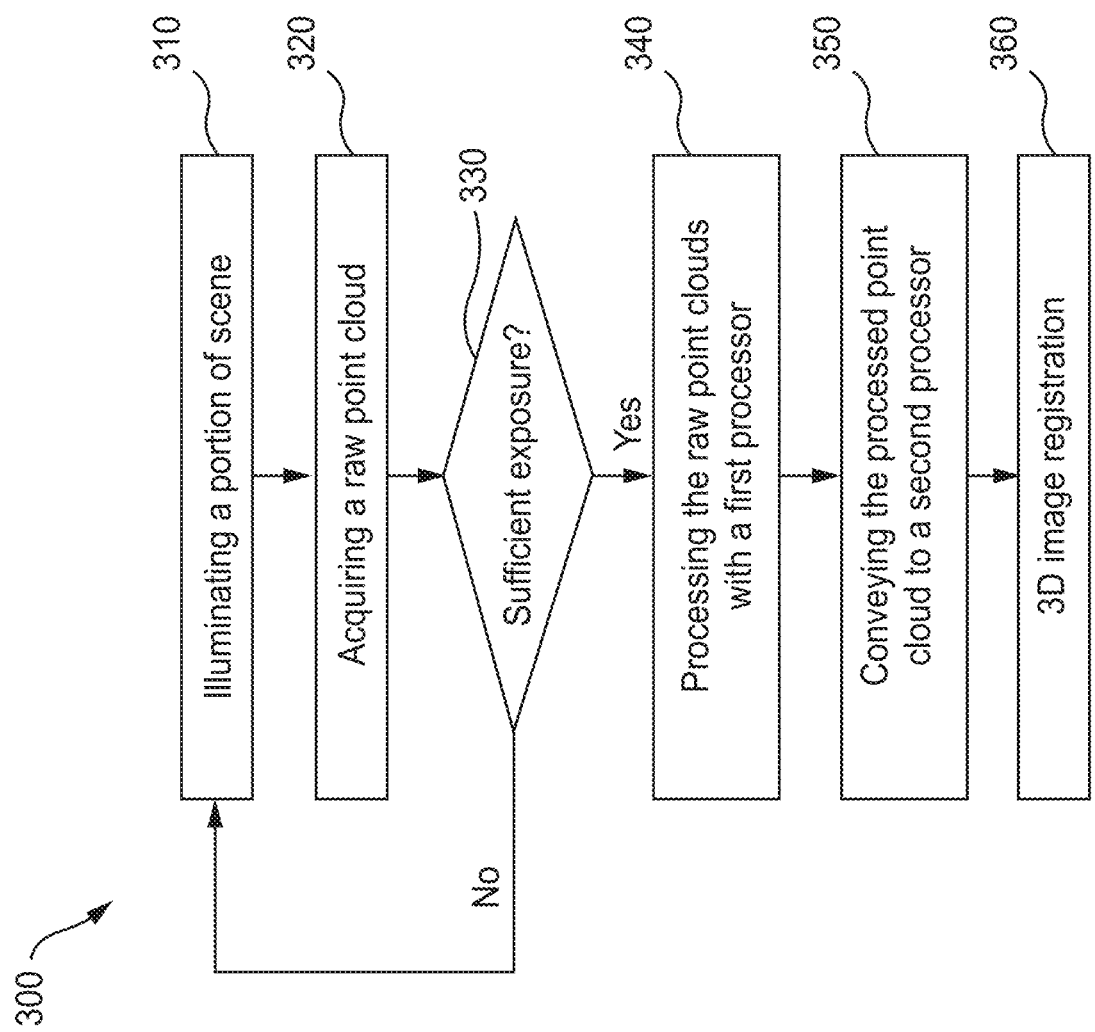

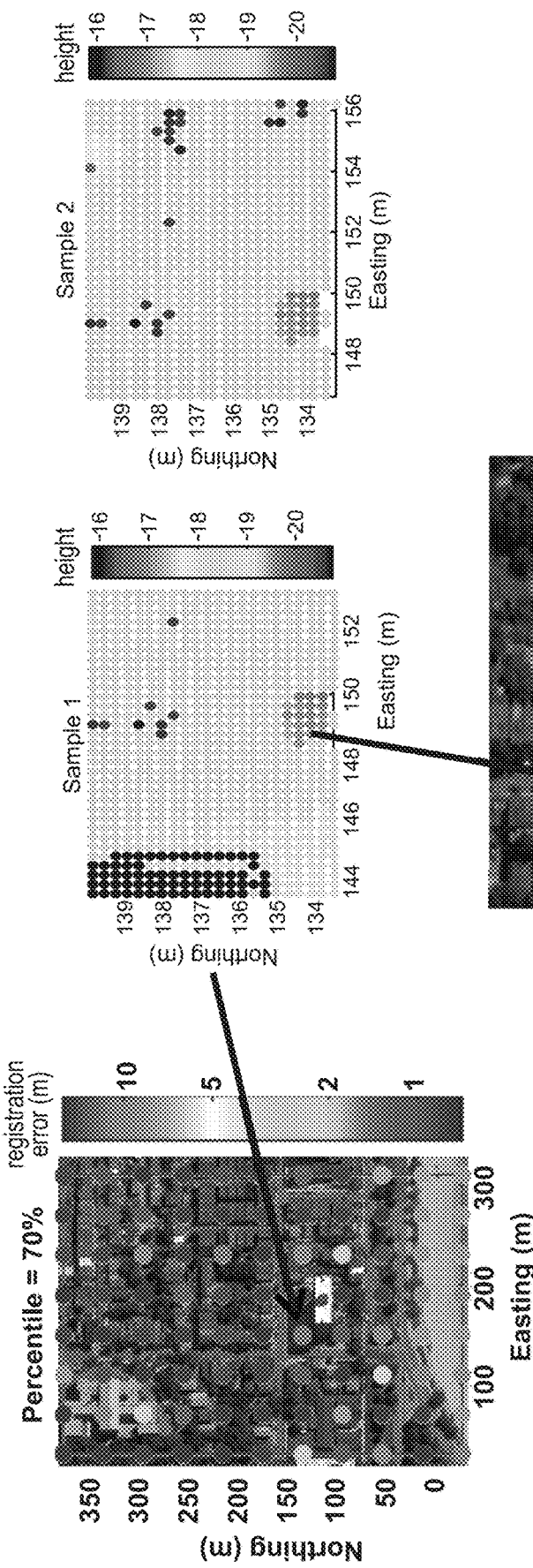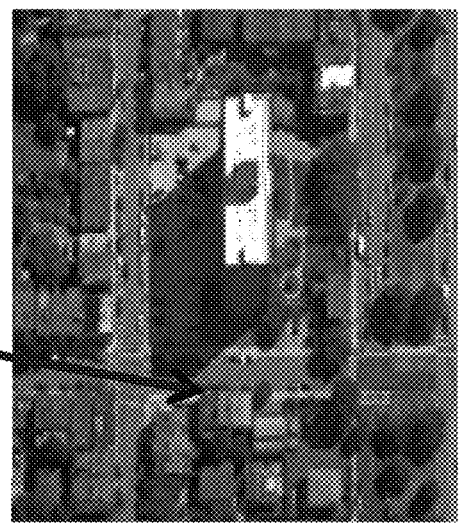
FIG. 11B

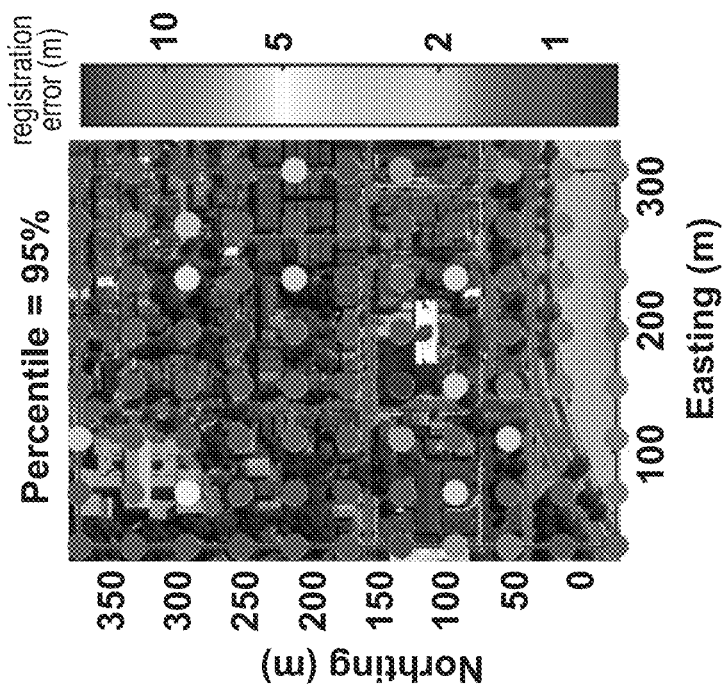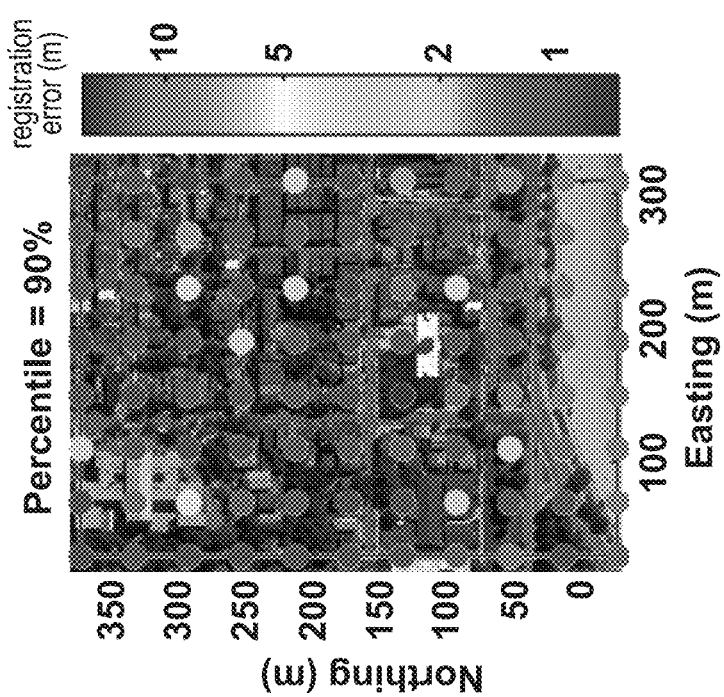
FIG. 11C

METHODS AND APPARATUS FOR THREE-DIMENSIONAL (3D) IMAGING

CROSS-REFERENCE TO RELATED PATENT APPLICATIONS

This application is continuation application of U.S. application Ser. No. 15/147,854, now U.S. Pat. No. 9,915,733, filed May 5, 2016, which is a bypass continuation of International Application No. PCT/US2015/046682, filed Aug. 25, 2015, which in turn claims priority, under 35 U.S.C. § 119(e), from: U.S. Application No. 62/042,303, filed Aug. 27, 2014, and entitled "PHOTON-TIMING DETECTOR ARRAY WITH EMBEDDED PROCESSOR"; U.S. Application No. 62/042,321, filed Aug. 27, 2014, and entitled "OPTICAL FIELD-OF-VIEW MULTIPLEXER"; U.S. Application No. 62/041,713, filed Aug. 26, 2014, and entitled "PHOTON-TIMING DETECTOR ARRAY WITH CONFIGURABLE REGION OF INTEREST"; and U.S. Application No. 62/041,755, filed Aug. 26, 2014, and entitled "MICROLADAR SYSTEM ARCHITECTURE." Each of these applications is hereby incorporated herein by reference in its entirely.

GOVERNMENT SUPPORT

This invention was made with government support under Contract No. FA8721-05-C-0002 awarded by the U.S. Air Force. The government has certain rights in the invention.

BACKGROUND

There are generally two types of remote sensing technologies: passive sensing and active sensing. In passive sensing, images or other representations of a target are created by detecting radiation that is generated by an external source, such as the sun. In contrast, active sensing technologies not only detect radiation reflected or scattered by a target but also generate the radiation to illuminate the target for subsequent detection.

Light Detection and Ranging (LIDAR, also known as LADAR) is an active sensing technique that involves emitting light (e.g., pulses from a laser) and detecting the reflected or scattered light. LIDAR typically measures the time-of-flight (i.e., the time it takes for the pulse to travel from the transmitter to the target, be reflected, and travel back to the sensor), which can be used to derive ranges (or distances) to the target which reflects or scatters the light. In this manner, LIDAR is analogous to radar (radio detecting and ranging), except that LIDAR is based on optical waves instead of radio waves.

LIDAR can be airborne or ground-based. Airborne LIDAR typically collects data from airplanes looking down and covering large areas of the ground. LIDAR can also be conducted from ground-based stationary and mobile platforms. Ground-based LIDAR techniques can be beneficial in producing high accuracies and point densities, thus permitting the development of precise, realistic, three-dimensional representations of scenes such as railroads, roadways, bridges, buildings, breakwaters, or shoreline structures.

SUMMARY

Embodiments of the present invention include methods and apparatus for three-dimensional imaging of a scene. In one example, a method of imaging a scene includes estimating a first three-dimensional (3D) representation of a first portion of the scene. The estimating of the first 3D representation includes illuminating the first portion of the scene with a first light burst comprising a first plurality of light pulses, the first light burst having a first burst duration substantially equal to or less than 1 millisecond. The estimation of the first 3D representation also includes generating a first plurality of point clouds, corresponding to the first plurality of the light pulses, by detecting photons reflected or scattered from the first portion of the scene using a focal plane array. A first data point in the first plurality of point clouds represents a first distance between the focal plane array and a first scene point in the first portion of the scene. The estimation of the first 3D representation also includes estimating the first 3D representation of the first portion of the scene based at least in part on the first plurality of point clouds. The method also includes estimating a second 3D representation of a second portion of the scene at least partially overlapping with the first portion of the scene. The estimating of the second 3D representation includes illuminating the second portion of the scene with a second light burst comprising a second plurality of light pulses, the second light burst having a second burst duration substantially equal to or less than 1 millisecond. The estimating of the second 3D representation also includes generating a second plurality of point clouds, corresponding to the second plurality of the light pulses, by detecting photons reflected or scattered from the second portion of the scene using the focal plane array. A second data point in the second plurality of point clouds represents a second distance between the focal plane array and a second scene point in the second portion of the scene. The estimation of the second 3D representation further includes estimating the second 3D representation of the second portion of the scene based at least in part on the second plurality of point clouds. The method then generates a three-dimensional image of the scene based at least in part on the first 3D representation of the first portion of the scene and the second 3D representation of the second portion of the scene.

In another example, an apparatus for generating a 3D image of a scene includes a light source to illuminate the scene with light pulses at a repetition rate greater than 10 kHz. The apparatus also includes a detector array to detect photons reflected or scattered by the scene so as to generate a detected data set representing respective arrival times and arrival angles of the photons reflected or scattered by the scene. An embedded processor is operably coupled to the detector array to generate a processed data set by removing at least one redundant data point and/or at least one noise data point from the detected data set. A processor is communicatively coupled to the embedded processor via a data link to receive the processed data set and generate the 3D image of the scene based on the processed data set.

In another example, a method of generating a representation of a scene includes illuminating a first portion of the scene with at least one first light pulse, followed by acquiring at least one first raw point cloud from photons reflected or scattered from the first portion of the scene using a focal plane array. A first data point in the at least one first raw point cloud represents a first distance between the focal plane array and a first scene point in the first portion of the scene. The method also includes removing, with a first processor, at least one of a first noise data point or a first redundant data point from at least one first raw point cloud so as to generate a first processed point cloud having fewer data points that the at least one first raw point cloud. The method further includes conveying the first processed point cloud to a second processor.

In another example, a method of imaging a scene includes illuminating the scene with an illumination light pulse, followed by acquiring an illumination point cloud, using a focal plane array, from photons in the illumination light pulse reflected or scattered from the scene. An area of interest is determined in the focal plane array based at least in part on the illumination point cloud, wherein the area of interest is smaller than an area of the focal plane array. The method also includes illuminating the scene with a plurality of signal light pulses. For each signal light pulse in the plurality of signal light pulses, a respective signal point cloud generated by at least one respective signal photon reflected or scattered by the scene is acquired from the area of interest in the focal plane array. The method further includes generating a three-dimensional image of at least a portion of the scene based at least in part on a plurality of signal point clouds from the plurality of signal pulses.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIG. 1A shows a schematic of a LIDAR system including an embedded processor.

FIG. 3 illustrates LIDAR methods including on-board data processing.

FIGS. 11A-11C shows example results for coarse registration of images of respective 100 $m^2$ areas that overlap with neighboring areas by about 70% and that were acquired by an airborne LIDAR system like the one shown in FIG. 1A.

DETAILED DESCRIPTION

Overview

Figure 1B:
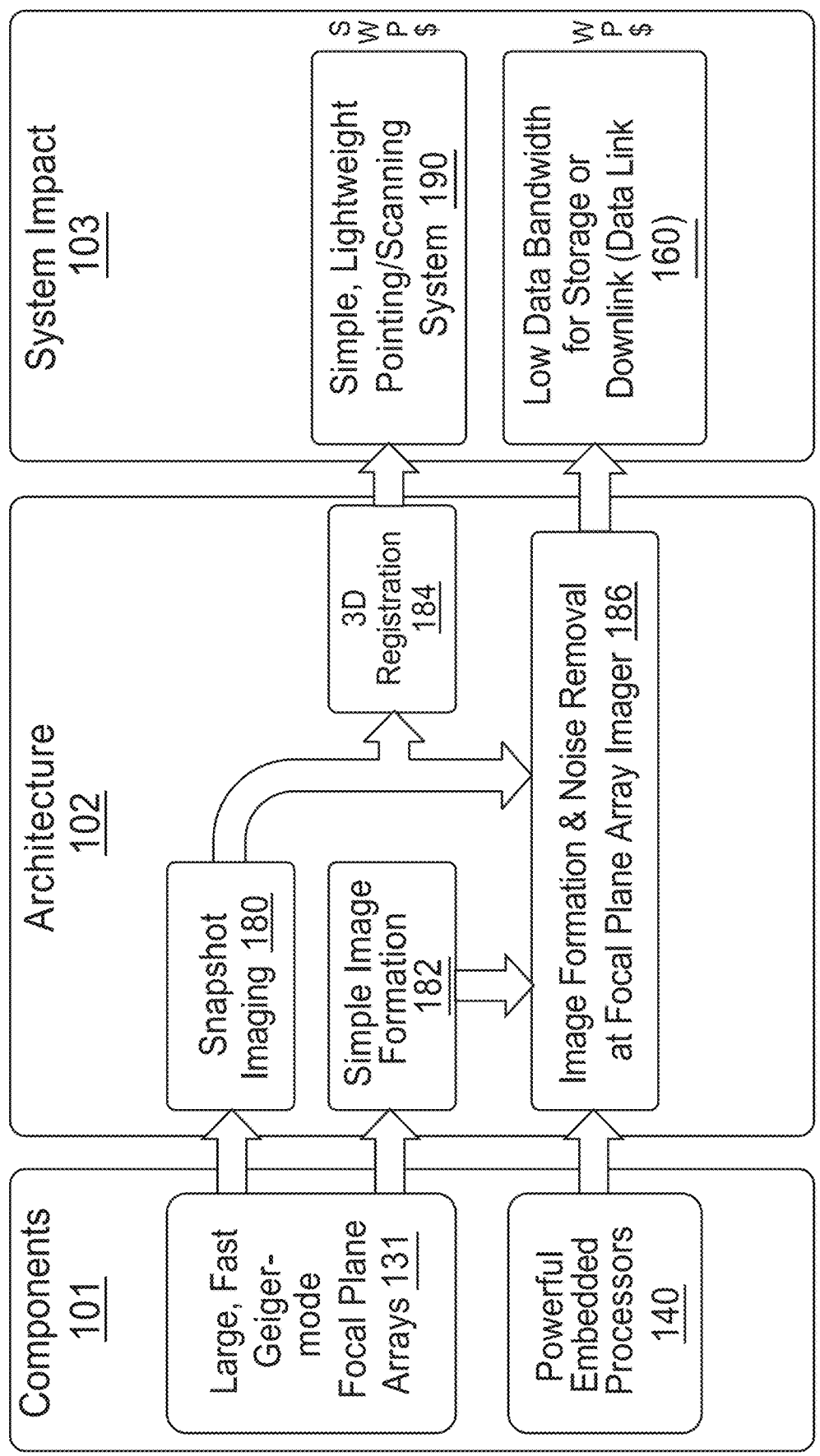
FIG. 1B is a block diagram showing an architecture of the LIDAR system in FIG. 1A.

A LIDAR system, using an airborne LIDAR system as an example, can include three major modules: a laser scanner, a georeferencing module, and a computer processing module.

A laser scanner can be further divided into three sub-components: an opto-mechanical scanner, a ranging unit, and a control processing unit. The opto-mechanical scanner can be a precision-engineered device that can provide a consistent stream of laser pulses, which are employed to illuminate the scene to be imaged. These laser pulses are typically sent into the ranging unit, where the laser pulses are reflected off a mirror (either rotating or scanning) and thereby transmitted to the target. The ranging unit also includes an electro-optical receiver to record the laser pulses that are returned from the scene, including recording the travel time of the laser pulses and communicating this data to the control processing unit. The repetition rate of this process can be as high as 100 kHz to 200 kHz.

A laser scanner by itself typically is not capable of recognizing or calculating coordinates of the reflected laser points. A georeferencing module is normally employed in conventional LIDAR systems to extrapolate a 3D coordinate from the range signal produced by the laser scanner so as to locate the scanner with respect to a coordinate system and extrapolate the range (distance) measured to a precise location on the ground. Georeferencing can be a direct measurement of the receiver position (X, Y, Z) and orientation (roll, pitch, and heading) with respect to the ground.

One example of georeferencing can be implemented by a Global Positioning System (GPS) and an inertial navigation system. GPS is a satellite-based technology embedded in many devices, from cell phones to automobiles. Similarly, LIDAR systems can use GPS technology to derive the precise X, Y, Z position of the receiver in three-dimensional space by, for example, mounting a GPS receiver on a moving platform, such as a vehicle or airplane. The GPS receiver used in LIDAR systems can be robust dual-frequency receivers with differential post-processing.

The inertial navigation in the georeferencing module can be based on two physics principles: 1) an object spinning rapidly tends to keep its relative orientation in space; and 2) on Earth, a rapidly spinning object typically aligns itself with gravity. In example implementations, the inertial navigation can be realized by an Inertial Measurement Unit (IMU) that includes three inertial gyroscopes that are aligned to the laser head in a LIDAR system, in which case the angular rotations of the receiver from vertical can be measured.

The IMU can also include accelerometers to measure the velocity (e.g., derived from acceleration measurement). An accelerometer, for illustrative purposes only, may be visualized as a weight suspended on a string from the top center of a container. Under quick movement of the container, the container normally moves first and the weight catches up with the movement with a delay (e.g., a fraction of a second). With a high precision clock and the ability to measure angles of the movement, an accelerometer can measure both the speed and direction of movement of the LIDAR receiver. However, the accuracy of the measurements from accelerometers tends to decrease as a function of time because of mechanical limitations and the external influence of gravity. Periodic updating of position can be provided by the GPS every 0.5 or 1 second.

The GPS/IMU system for a LIDAR system can be initialized on the ground with respect to a base station. During the flight mission, the LIDAR system normally stays within 50 miles of the reference base station in order to maintain the accuracy. Upon completion of the flight, the LIDAR system and the reference base station are reinitialized to provide closure.

The computer processing module in a LIDAR system coordinates the activity of each individual component (e.g., laser scanner, GPS, and IMU). For example, the computer processing module can integrate the data from each component into usable and accurate range information (e.g., elevation on the ground). The data from each component includes, for example, the time information of the reflected laser pulses generated by the laser scanner is to generate laser pulses and time the reflections, the positioning data from the GPS, and the angular motion and velocity data from the IMU.

Compared to some conventional remote sensing techniques, such as aerial photographs, LIDAR techniques can have several advantages. For example, LIDAR can rapidly measure the Earth's surface, e.g., at sampling rates greater than 150 KHz (i.e., 150,000 pulses per second). The resulting product is a densely spaced network of highly accurate georeferenced elevation points (often referred to as a point cloud), which can be used to generate three-dimensional representations of the Earth's surface.

LIDAR can also operate with high accuracy. Typically, LIDAR-derived elevations can have absolute accuracies of about 6 to 12 inches (15 to 30 centimeters) for older data and 4 to 8 inches (10 to 20 centimeters) for more recent data; relative accuracies (e.g., heights of roofs, hills, banks, and dunes) can be even better.

LIDAR can also "see under trees" when, for example, acquiring elevation data from above the Earth's surface (e.g., from airplanes or satellites). As long as some photons of the laser pulses in LIDAR can reach the ground through the canopy and reflect or scatter back to the receiver, the reflected photons can be employed to derive the ground information. Practically, if one can see the sky through the trees at certain location, then that location can be measured with LIDAR.

To further explore the benefit of LIDAR concept, it can be desirable to reduce the size, weight, and power (SWaP) of the systems that implement the LIDAR concept. A conventional LIDAR system typically includes at least a laser source, a detector, a precision opto-mechanical scanner, and an IMU. With the development of semiconductor technologies, lasers and detectors have advanced in miniaturization. However, the opto-mechanical scanners and IMU remain bulky in most existing LIDAR systems. Therefore, the total SWaP of a LIDAR system is typically dominated by the precision opto-mechanical scanners and the IMU that are employed to create sharp imagery.

LIDAR Systems Including Embedded Processors

LIDAR techniques (and the systems implementing the techniques) can include one or more of the following features to further reduce the total SWaP:

An array of detectors can be employed to derive relative alignment of pixels across a sizable image chip;

The system can be operated so that a sizeable image chip can be acquired faster than any blurring of the image can occur;

The system can be operated so that image chips are collected fast enough so the array field-of-view moves between chips by less than the FOV width, thereby ensuring significant overlapping between subsequent chips;

The detectors can be operated in a photon-counting mode so that a minimal number of detected photons can be sufficient in making a range measurement (e.g., 7-15 photons), and therefore low power lasers and/or small receiver apertures can be used;

Processing of the raw point clouds into estimates of scene content can be simplified to the point of implementation on low-power FPGAs since the processing can be done in angle-angle-range space and is therefore local and pipelineable;

Individual image chips can be pieced together into a mosaic of a useful size using 3D registration, therefore eliminating the need for precision opto-mechanics and platform position sensors;

Compact pulsed sources, such as a CW-pumped passively Q-switched microchip laser or fiber laser, can be employed to provide sufficient power since the power-aperture requirements can be small;

Temperature control of the laser can be provided by passive means, and may be simplified by the addition of passive wavelength stabilization elements in the laser pump diodes;

The detector array can function without the need of temperature control. Instead, the operating voltage of the detectors can be adjusted to optimize performance at the measured device temperature.

The resulting compact LIDAR systems can find broad applications in a variety of fields including, but are not limited to vision system for autonomous navigation of robots; surveillance sensors for small UAVs; navigation in GPS-denied environments; autonomous navigation and collision avoidance sensors in automobiles and aircraft; driver assistance systems in automobiles; line-of-sight analysis; helicopter landing zone determination; trafficability maps; route finding; disaster assessment (flood zone determination); pipe- and power-line infrastructure monitoring; construction; forestry; mining; cued 3D sensing for object identification; and multi-mode receivers for optical communications.

FIG. 1A shows a LIDAR system 100 that can address, at least partially, the challenges to further reduce the total SWaP of LIDAR systems. This approach can use a pulsed laser to illuminate the scene and achieve the desired range resolution. In one example, the laser can be one or a few passively Q-switched microchip lasers. To simplify thermal control, the wavelength of the pump diodes may be grating-stabilized, thereby widening the allowable temperature window. To simplify electrical control the diodes may be operated in the CW pumping mode during the burst, without the necessity of fast, high-current electronics. The average PRF can be tweaked by adjusting the diode pump current. The microchip laser can be mounted in very close proximity to the pump diode emission facet, perhaps separated by mode-matching optics. In another example, the laser can be a pulsed fiber laser, which can have higher electrical-to-optical conversion efficiency, and therefore longer achievable ranges for a given platform power budget. Fiber lasers can be made very compact, and even fabricated as waveguides on an integrated optical device. In yet another example, the laser can be directly-modulated semiconductor lasers, which can have even higher efficiency (e.g., $10^1$-$10^2$ times higher PRFs, compared to microchips).

The LIDAR system 100 includes a light source 110 configured to transmit light pulses 10 that can illuminate a scene 20. At least a portion of the scene 20 reflects or scatters the incident light pulses 10 back to the LIDAR system 100. An imaging optic 170 collects at least a portion of the return pulses 15 and transmits the return pulses 15 to a focal plane array 130 comprising a plurality of sensing elements 132 (three are shown in FIG. 1A). Photons in the return pulses 15 can be detected and converted into electrical signals by the focal plane array 130. The focal plane array 130 and the light source 110 are communicatively coupled by a timing unit 120, which helps the focal plane array 130 to record the time of flight of the photons reflected or scattered back by the scene 20. An embedded processor 140 is operably coupled to the focal plane array 130 to promptly process raw data generated by the focal plane array 130. The processed data is then conveyed to a second processor 150 via a data link 160 for further processing (e.g., registration of 3D images of the scene).

For illustrative purposes only, the LIDAR system 100 shown in FIG. 1 is an airborne LIDAR which can be, for example, mounted on an airplane or a helicopter so as to image a wide area of scene. In another example, the LIDAR system 100 can be ground-based, in which case the LIDAR system 100 can be mounted on a vehicle or a robot to image a scene. In yet another example, the LIDAR system 100 can be mounted on a stationary platform such as a tripod or mast. In yet another example, the LIDAR system 100 can be a portable and/or a hand-held device, which can be used in environments which have constraint in accessibility to vehicle.

In one example, the LIDAR system 100 can be employed in short-range systems that operate at ranges of less than 100 meters with panoramic scanning, such as mapping building interiors or ranging small objects. In another example, the LIDAR system 100 can be used for medium range systems operating at distances of, for example, 100-250 meters. These systems can achieve centimeter range accuracies (e.g. vertical accuracy) in high definition (angular, e.g. horizontal accuracy), such as for surveying and/or 3D modeling a bridge and dam monitoring. In yet another example, the LIDAR system 100 can be used in long range systems, which can measure at distances of up to one kilometer and are frequently used in open-pit mining and topographic survey applications.

The Light Source:

The light source 110 in the LIDAR system 100 can be either incoherent or coherent. Incoherent light sources can include, for example, white-light sources generated by laser-created filaments. Coherent light source can include lasers operating at various wavelengths and modes.

It can be helpful, in general, for the light source 110 to have the following properties: high power and/or brightness, short pulse durations (e.g., 0.1 ns to 10 ns), the capability to modulate the laser light with a frequency chirp, high collimation, and narrow bandwidth of the optical spectrum. High power and/or brightness of the light source 110 can better illuminate the scene to be imaged. Short pulse durations can improve the temporal resolution of the imaging. Frequency chirp of the light pulses can be used to construct LIDAR systems operating in continuous mode. High collimation of the light pulses may increase the number of photons that can be reflected or scattered back to the detector, thereby increasing the photon collection efficiency of the LIDAR system (i.e., fewer photons are required in each illumination light pulse to image a scene). Narrow spectral line can be advantageous in LIDAR techniques at least because narrow optical interference filters usually with 1 nm bandwidth can be mounted in the receiving path to suppress disturbing background radiation, caused, e.g., by backscattered sunlight.

The wavelength of the light source 110 can depend on several practical considerations. In one example, the wavelength of the laser source 110 can be dependent on the wavelength sensitivity of the detector (e.g., the focal plane array 130) used in the LIDAR system. Generally speaking, it can be helpful to use a wavelength at which the corresponding detector is most sensitive. Greater sensitivity lowers the amount of energy for each light pulse, or the number of photons in each light pulse, to achieve a given signal strength. Currently, sensitive detectors are available at wavelengths between 500 nm and 2200 nm. Therefore, the light source 110 in the LIDAR system can also operate within this wavelength range (e.g., semiconductor laser diodes).

In another example, the wavelength of the light source 110 can be dependent on the consideration of safety to eyes of humans (or other creatures). If higher pulse energy is desired, it can be desirable to operate the light source 110 at wavelengths in which the eye is less susceptible to damage. Generally, eye safety issues can be relaxed at wavelengths below 400 nm or above about 1400 nm because light at these wavelengths typically do not penetrate human tissue and therefore only interact at the surface of the cornea or skin. At these wavelengths, higher energy levels can be employed without significant risk of damaging the eye.

Using a high energy in each light pulse at eye-safe wavelengths can also incur several other benefits. First of all, the higher energy in each pulse can compensate the relatively lower sensitivity of detectors. Second, the maximum range can also be extended, by using higher energy in each pulse, to more than 1500 meters while maintaining the same ranging performance with respect to signal-to-noise-ratio (SNR) and accuracy. Third, the background radiation caused by the sunlight, which can degrade the SNR, can be lower at eye-safe wavelengths (e.g., 1535 nm), at least because spectral components at these wavelengths occupy only a small portion of the sun light, which is mostly visible.

In yet another example, the wavelength of the light source 110 can be dependent on the reflective or scattering properties of the target surface. In general, it can be helpful to choose a wavelength at which the target surface can have high reflectivity. For example, trees can have a reflectivity of about 50% at wavelengths between approximately 700 nm and 1400 nm, but their reflectivity decreases to about 10% outside this range. Snow and ice, in contrast, have a good reflectivity (>65%) at wavelengths below 1400 nm, but a low reflectivity (<40%) at about 1400 nm. The reflectivity of asphalt and soil generally is higher at longer wavelengths within the range of 400 nm and 2000 nm. Accordingly, LIDAR systems can operate in the near-infrared region for topography applications, although some systems operate in the green band to penetrate water and detect bottom features.

In yet another example, the wavelength of the light source 110 can be dependent on the atmospheric transmission (or absorption). For long range distances, the atmosphere may absorb a significant portion of light at certain wavelengths particularly in the near infrared and infrared region. Therefore, it can be beneficial to use wavelengths of light that is less absorptive. For short distances, atmospheric transmission can be less influential in selecting the wavelength of the light source 110.

In yet another example, the light source 110 in the LIDAR system 100 can operate at multiple wavelengths so as to, for example, cover a scene including more than one surface type or more than one designated application (topography, hydrography, or glaciography), or to retrieve additional information about the targets, such as, e.g., crop analysis or tree species detection by using several wavelengths in parallel.

Multiple-wavelength operation of the LIDAR system 100 can be achieved in several schemes. In one example, the LIDAR system 100 can scan a target scene 20 with at least two laser sources 110 operating at different wavelengths during separate flights. Laser sources 110 may be mounted on different platforms or on the same platform that are exchanged between flights. In another example, the LIDAR system 100 can implement multi-wavelength operation via joint scanning of a target scene 20 using at least two laser sources 110 operating at different wavelengths mounted on the same platform. In yet another example, the LIDAR system 100 can scan the target the scene 20 with at least two substantially coaxial laser beams at different wavelengths such that photons of different wavelengths can be collected almost simultaneously. In yet another example, multi-wavelength operation of the LIDAR system 100 can be achieved by using a tunable laser source 110. The LIDAR system 100 can scan one portion of the scene 20 using one wavelength and scan another portion of the scene using another wavelength. Additionally or alternatively, the LIDAR system 100 can tune the wavelength of the light source 110 during the scanning of a same portion of the scene 20 so as to capture additional information of the scene.

In view of the above considerations, various specific laser systems can be employed as the light source 110 in the LIDAR system 100. In one example, the light source 110 can include a passively Q-switched Nd:YAG (neodymium-doped yttrium-aluminum-garnet) microchip laser operating at either the fundamental wavelength at 1064 nm or the second harmonic at 532 nm. The Nd:YAG laser can be pumped by one or more diode lasers.

In another example, an actively Q-switched Nd:YAG laser can be used to generate sub-nanosecond pulses at 30-100 kHz repetition rates with single- or few-mode operation. Commercially-available amplifiers can boost the pulse energies to millijoule levels or more. The low timing jitter of active Q-switching allows the LIDAR system designer to precisely control the PRF during system operation. In this way, one may accommodate multiple pulses that are traversing the distance between the system and the target, while simultaneously ensuring that the bright outgoing pulses do not dazzle the sensitive photodetectors while they are sensing the weak return pulses.

In another example, the light source 110 can include a fiber laser, which typically has good spatial and spectral qualities and can be configured to operate in continuous, modulated, or pulsed mode. Output wavelength of fibers lasers are tunable and can be eye-safe. The core of the fiber can be doped with rare-earth elements such as erbium (Er), ytterbium (Yb), neodymium (Nd), dysprosium (Dy), praseodymium (Pr), thulium (Tm), holmium (Ho), and different synthesizers of these elements. Nd- or Yb-doped silica fiber could provide emission around 1 µm. Yb-doped silica fiber can be a promising platform for high power applications due to the high optical to optical conversion efficiency. Er-doped silica fiber lasers and amplifiers can operate at around 1.55 µm. Emission at 2 µm can be achieved by thulium or holmium-doped silica or germanate fibers.

In yet another example, the light source 110 can include a semiconductor laser. The semiconductor laser can produce diffraction-limited emission by, for example, a ridge waveguide having a width of about several microns so as to preferably lase (amplify via stimulated emission) the fundamental mode. The semiconductor laser can also produce spectrally stabilized emission using a Bragg grating integrated into the semiconductor chip so as to construct a distributed Bragg reflector (DBR) laser or a distributed feedback (DFB) laser. Q-switch techniques can also be used in semiconductor lasers to produce short laser pulses (e.g., pulse duration shorter than 1 ns) for LIDAR applications.

Semiconductor optical amplifiers, either monolithically or hybrid integrated with the master oscillator, can be used to increase the output energy of the laser. The amplifiers can be constructed in a multi-stage configuration, in which case the amplifiers can also be employed to control the repetition rate, either as pulse picker to select individual pulses or as optical gate to generate an optical pulse out of a continuous wave (CW) master oscillator with desired spectral properties. Using a DFB-RW laser operated in continuous wave as master oscillator and a multi-section tapered amplifier, optical pulses having a length of 15 ns at a repetition rate of 25 kHz with peak powers up to 16 W can be obtained.

In yet another example, the light source 110 can include a semiconductor laser based on based on two InGaAsP/InP monolithic Master Oscillator Power Amplifiers (MOPAs) operating at, for example, about 1.57 µm. Each MOPA can include a frequency stabilized Distributed Feedback (DFB) master oscillator, a modulator section, and a tapered amplifier. The use of a bended structure (the oscillator, the modulator, and the amplifier are not arranged along a straight line) may avoid undesired feedback and thus provide good spectral properties together with high output power and good beam quality.

In yet another example, the light source 110 can include a parametric light source such as an optical parametric oscillators (OPOs) and/or an optical parametric amplifier (OPAs), which are typically tunable and can generate emission at wavelengths from the ultraviolet to the mid-infrared range. OPOs and OPAs can have the benefit of good spectral property, high electrical-to-optical efficiency, ruggedness, and small volume.

In general, the fundamental or harmonics of Q-switched, diode-pumped Nd:YAG lasers serve as the pump for an OPO or OPA. For different applications, different wavelength can be generated. More specifically, 300 nm radiations, which may be useful in Ozone detection and imaging, can be generated by sum frequency mixing of OPO radiation with the harmonics of the pump. 935 nm radiations, which can be used in water vapor measurements, can be directly generated by a 532-nm pumped OPO, with the optional use of injection seeding to further improve the spectral width close to Fourier limit.

The Focal Plane Array

The focal plane array 130 in the LIDAR system 100 shown in FIG. 1A can detect and/or record several types of information of the photons in the return pulse 15. In general, the focal plane array 130 may include sensing elements 132, such as Geiger-mode avalanche photodiodes (APDs), that can detect photons. In some cases, the sensing elements in the focal plane array 130 may be sensitive enough to detect and time-stamp single photons. The focal plane array 130 can also record the time of flight of the photons by, for example, comparing the arrival time of the photons with the time at which the photons were transmitted. In addition, the focal plane array 130 can record the location (e.g., sensing element position or region within the focal plane array 130) at which each photon is detected. The focal plane array 130 can also record intensity information of the detected photons by, for example, recording the number of photons received at each pixel location or pixel region.

In practice, it can be helpful for the focal plane array 130 to have the following properties: 1) high detection efficiency, i.e., high probability that a photon is successfully detected every time it hits the detector; 2) low dark current, i.e., low probability that the detector registers a photon when none is there; 3) low reset or "dead time", i.e., a short interval after a detection during which the device cannot detect a new photon; 4) low cross-talk, i.e. low probability that neighboring pixels detect photons arising from the detection process in a given pixel; and 5) low "timing jitter", i.e., low uncertainty in specifying when a photon arrives.

In one example, the focal plane array 130 can include an array of APDs, which are reverse-biased variants of p-n junction photodiodes. Typically, one pixel includes one APD, one biasing circuit, one timing circuit, and an interface to the readout circuitry (e.g. shift registers) for the entire array. Without being bound any particular theory or mode of operation, reversely biasing a p-n junction photodiode can generate an electric field in the vicinity of the junction. The electrical field tends to keep electrons confined to the n side and holes confined to the p side of the junction. Absorption of a photon having sufficient energy (e.g., >1.1 eV for silicon) can produce an electron-hole pair, after which the electron in the pair can drift to the n side and the hole can drift to the p side, resulting in a photocurrent flow in an external circuit.

The same principle can also allow an APD to detect light. However, an APD is typically designed to support high electric fields so as to facilitate impact ionization. More specifically, the electron and/or the hole in an electron-hole pair generated by photon absorption can be accelerated by the high electric field, thereby acquiring sufficient energy to generate a second electron-hole pair by colliding with the crystal lattice of the detector material. This impact ionization can multiply itself many times and create an "avalanche." A competition can develop between the rate at which electron-hole pairs are being generated by impact ionization and the rate at which they exit the high-field region and are collected. The net result can be dependent on the magnitude of the reverse-bias voltage: if the magnitude is below a value (commonly known as the breakdown voltage), collection normally outruns the generation, causing the population of electrons and holes to decline. An APD operating in this condition is normally referred to as a linear mode APD. Each absorbed photon normally creates on average a finite number M (also referred to as the internal gain) of electron-hole pairs. The internal gain M is typically tens or hundreds.

While M might be the average number of electron-hole pairs generated by one absorbed photon, the actual number may vary, inducing gain fluctuations. This gain fluctuation can produce excess noise, or multiplication noise, which typically gets progressively worse with the increase of M. Therefore, once the point is reached where the multiplication noise dominates over the noise introduced by downstream circuitry, further increases in gain may deteriorate the system signal-to-noise ratio. The multiplication noise can also depend on material properties because, in general, electrons and holes can have different capabilities to initiate impact ionizations. For example, in Si, electrons can be much more likely to impact ionize compared to holes. Therefore, it might be helpful for electrons to initiate impact ionization in silicon-based APDs.

In another example, the focal plane array 130 can include an APD operating in Geiger mode (also referred to as a Geiger-mode APD or GmAPD). A GmAPD operates when the reversely biased voltage is above the breakdown voltage. In this case, electron-pair generation normally outruns the collection, causing the population of electrons and holes in the high-field region and the associated photocurrent to grow exponentially in time. The growth of photocurrent can continue for as long as the bias voltage is above the breakdown voltage.

A series resistance in the diode, however, can limit the current growth by increasing the voltage drop across the series resistance (thereby reducing the voltage across the high-field region) as the current grows. This effect can therefore slow down the rate of growth of the avalanche. Ultimately, a steady-state condition can be reached in which the voltage across the high-field region is reduced to the breakdown voltage, where the generation and extraction rates balance. Stated differently, the series resistance can provide negative feedback that tends to stabilize the current level against fluctuations. A downward fluctuation in current, for example, can cause a decrease in the voltage drop across the series resistance and an equal increase in the drop across the APD high-field region, which in turn increases the impact-ionization rates and causes the current to go back up.

The quenching circuit of the APD employed for the LIDAR system 100 can be either passive or active. In a passive-quenching circuit, the APD is charged up to some bias above breakdown and then left open circuited. The APD then discharges its own capacitance until it is no longer above the breakdown voltage, at which point the avalanche diminishes. An active-quenching circuit actively detects when the APD starts to self-discharge, and then quickly discharges it to below breakdown with a shunting switch. After sufficient time to quench the avalanche, the active-quenching circuit then recharges the APD quickly by using a switch. In LIDAR systems, where the APD typically detects only once per laser pulse, the recharge time can be slow. There is also interest, however, in using the Geiger-mode APDs to count photons to measure optical flux at low light levels. With a fast active-quenching circuit, the APD can be reset shortly after each detection (e.g., on a time scale as short as nanoseconds), thereby allowing the APD to function as a photon-counting device at much higher optical intensities.

In yet another example, the focal plane array 130 can include an array of superconducting nanowire single-photon detectors (SNSPDs), each of which typically includes a superconducting nanowire with a rectangular cross section (e.g., about 5 nm by about 100 nm). The length is typically hundreds of micrometers, and the nanowire can be patterned in compact meander geometry so as to create a square or circular pixel with high detection efficiency. The nanowire can be made of, for example, niobium nitride (NbN), tungsten silicide (WSi), $YBa_2Cu_3O_{7-\delta}$, or any other material known in the art.

In operation, the nanowire can be maintained below its superconducting critical temperature $T_c$ and direct current biased just below its critical current. Without being bound by any particular theory of mode of operation, incident photons having sufficient energy to disrupt hundreds of Cooper pairs in a superconductor can therefore form a hotspot in the nanowire. The hotspot itself typically is not large enough to span the entire width of the nanowire. Therefore, the hotspot region can force the supercurrent to flow around the resistive region. The local current density in the sidewalks can increase beyond the critical current density and form a resistive barrier across the width of the nanowire. The sudden increase in resistance from zero to a finite value generates a measurable output voltage pulse across the nanowire.

Various schemes can be employed in SNSPD to improve the detection performance. In one example, the SNSPD can employ a large area meander strategy, in which a nanowire meander is written typically across a 10 µm×10 µm or 20 µm×20 µm area so as to improve the coupling efficiency between the incident photons and the SNSPD. In another example, the SNSPD can include a cavity and waveguide integrated design, in which a nanowire meander can be embedded in an optical cavity so as to increase the absorption efficiency. Similarly, a nanowire can be embedded in a waveguide so as to provide a long interaction length for incident photons and increase absorption efficiency. In yet another example, ultra-narrow nanowires (e.g., 20 nm or 30 nm) can be employed to construct the nanowire meander so as to increase the sensitivity to low-energy photons.

In yet another example, the focal plane array 130 can include a transition edge sensor (TES), which is a type of cryogenic particle detector that exploits the strongly temperature-dependent resistance of the superconducting phase transition. In yet another example, the focal plane array 130 can include a scintillator counter which can detect and measure ionizing radiation by using the excitation effect of incident radiation on a scintillator material, and detect the resultant light pulses.

Embedded Processor

The embedded processor 140 in the LIDAR system 100 is operably coupled to the focal plane array 130 and processes raw data generated by the focal plane array 130. The embedded processor 140 can be coupled to the focal plane array 130 via a Readout Integrated Circuit (ROIC) (not shown in FIG. 1A). In operation, the ROIC can read out the photocurrent generated by the focal plane array 130, time stamp the photon arrivals, read out the pixel locations of the received photons, and convey the information off the ROIC and into the embedded processor 140.

In one example, the ROIC can store signal charge, generated by the focal plane array 130, at each pixel and then route the signal onto output taps for readout. The ROIC can accumulate signal charge on an integrating capacitor. The total integrated charge can meet desired dynamic ranges by using appropriate capacitors and bias voltages according to total charge=bias voltage×capacitance. The ROIC can store large signal charge at each pixel site and maintain signal-to-noise ratio (or dynamic range) as the signal is read out and digitized.

In another example, the ROIC can be digital as disclosed in U.S. Pat. Nos. 8,179,296; 8,692,176; and 8,605,853, each of which is incorporated herein by reference in its entirety. More specifically, each pixel of the digital ROIC can include a full-dynamic-range analog-to-digital converter as well as local digital signal processing (DSP) support. Each pixel can transfer data to any of its four nearest neighbors; the entire array can be read out by using high-speed digital readout circuits. The ROIC can digitize the detector current within each pixel by incrementing a counter each time a small charge bucket is filled. In general, a larger detector current can result in a quicker filling of the bucket and quicker increment of the counter. In this ROIC, the total charge can be given by the size of the charge bucket (in electrons) times the digital value in the counter. In yet another example, the counter containing the digital representation of the detector signal at each pixel can be connected through a multiplexor to four nearest neighboring pixels. High-speed serializers located on the edge of the ROIC can transfer the array contents onto a set of high-speed digital output taps for readout. Digital ROIC can have the benefit of being compatible with advanced low-voltage (and thus low-power) deeply scaled IC fabrication processes that can allow increased circuit density and increased on-chip processing power. Furthermore, digital ROIC can have high speeds at which data can be read out.

The embedded processor 140, and optionally the ROIC, can be integrated with the focal plane array 130 through several techniques. In one example, 3D integrated circuit technology can be employed. More specifically, a 3D focal plane array and circuits can be fabricated by transferring and interconnecting fully fabricated silicon-on-insulator (SOI) substrates to a base wafer. The base wafer can be a high fill factor detector wafer or another circuit wafer. Each functional section can be referred to as a tier. Tier 2 can be transferred to the base tier (i.e., tier 1) via face-to-face infrared alignment, and oxide-oxide bonding. The handle silicon of a transferred tier can be removed by grinding the silicon (e.g., to a thickness of ~50 µm) followed by a silicon etching (e.g., in a 10% TMAH solution at 90° C.). Then 3D vias can be patterned to expose metal contacts in both tiers, followed by filling the 3D vias with conductive material (e.g., damascene tungsten) to electrically connect the two tiers. A third tier, tier 3, can then be added to the tier 1-2 assembly using the similar processes. The resulting assembly can include an imaging tier (e.g., focal plane array 130), a readout tier (e.g., the ROIC), and a signal processing tier (e.g., the embedded processor).

In another example, the assembly of the focal plane array 130 and the embedded processor 140 can be integrated horizontally. For example, the focal plane array ROIC 130 and the embedded processor 140 can be fabricated on the same substrate. Alternatively, the focal plane array 130 and the embedded processor can be simply disposed adjacent to each other on a common board as long as the coupling allows fast transmission of data from the focal plane array 130 (or the ROIC) to the embedded processor for prompt processing.

In yet another example, a hybrid technology including both 3D integrated circuit and horizontal integration. More specifically, the focal plane array 130 can be integrated with the ROIC via 3D integration circuit technology, while the embedded processor is disposed adjacent to the focal plane array 130.

The embedded processor 140 can be realized either as a Field Programmable Gate Array (FPGA) or an Application Specific Integration Circuit (ASIC). In one example, the FPGA approach can be employed for its relatively simple design. A Field-Programmable Gate Array (FPGA) is generally a semiconductor device containing programmable logic components conventionally referred to as "logic blocks" and programmable interconnects. Logic blocks can be programmed to perform the function of basic logic gates such as AND, and XOR, or more complex combinational functions such as decoders or mathematical functions. For example, a VIRTEX-7 FPGA, manufactured by XILINX, can deliver 2 million logic cells, 85 Mb block RAM, and 3,600 DSP48E1 slices for new possibilities of integration and performance.

In another example, the ASIC approach can be employed for its more powerful computation capability. An ASIC is generally an integrated circuit designed for a particular use, rather than intended for general-purpose use. Example ASICs include processors, RAM, and ROM. Therefore, ASIC can be more complicated, and thus more expensive, than FPGA. In practice, the decision of using a FPGA or an ASIC may depend on several factors, such as the budget, time constraint, and fabrication capabilities.

Second Processor

The second processor 150 in the LIDAR system 100 shown in FIG. 1A is configured to further process the data provided by the embedded processor 140 and ultimately generate a 3D image of the scene 20. The second processor 150 is generally more powerful than the embedded processor 140 and can perform functions such as 3D registration.

In one example, The second processor 150 can be a microprocessor, microcontroller, CPU, or suitable FPGA. In another example, the second processor 150 may be any electronic device that can analyze and/or process data and generate one or more 3D images. To this end, the second processor 150 may include or be associated with a computing device, such as a portable computer, personal computer, general purpose computer, server, tablet device, a personal digital assistant (PDA), smart phone, cellular radio telephone, mobile computing device, touch-screen device, touchpad device, and the like.

The data link 160 that convey data between the embedded processor 140 and the second processor 150 may be any suitable wired and/or wireless communication interfaces by which information may be exchanged. Example wired communication interfaces may include, but are not limited to, USB ports, RS232 connectors, RJ45 connectors, and Ethernet connectors. Example wireless communication interfaces may include, but are not limited to, Bluetooth technology, Wi-Fi, Wi-Max, IEEE 802.11 technology, radio frequency (RF), LAN, WAN, Internet, shared wireless access protocol (SWAP), Infrared Data Association (IrDA) compatible protocols and other types of wireless networking protocols, and any combinations thereof.

FIG. 1B is a block diagram showing a general architecture of the LIDAR system 100 in FIG. 1A. The general architecture includes three parts. The first part is a components part 101 which include large, fast Geiger-mode focal plane arrays 131 and a powerful embedded processor 140.

The second part is an architecture part 102 which includes functions that can be performed by the components part. More specifically, the Geiger-mode focal plane arrays 131 can allow snapshot imaging 180 of multiple portions of a scene. The snapshot imaging 180 can further allow 3D registration 184 via, for example, sequential image registration. The Geiger-mode focal plane array 131 can also allow simple image formation 182 such as image formation for each portion of the scene. The embedded processor 140 can perform image formation from raw data acquired by the focal plane array. The embedded processor 140 can also remove noise and redundancy (186) from the raw data.

The third part is a system impact part 103, which includes advantages that can be derived from the components and architecture parts. For example, the 3D registration 184 can allow the use of simple, lightweight pointing and scanning systems 190, instead of the bulky precision opto-mechanical scanners, thereby reducing the SWaP of the resulting system 100. In addition, noise and redundancy removal 186 by the embedded processor 140 can reduce the data bandwidth for storage or downlink (data link 160) such that the weight and power consumption of the resulting system 100 can be decreased.

Figure 1C:
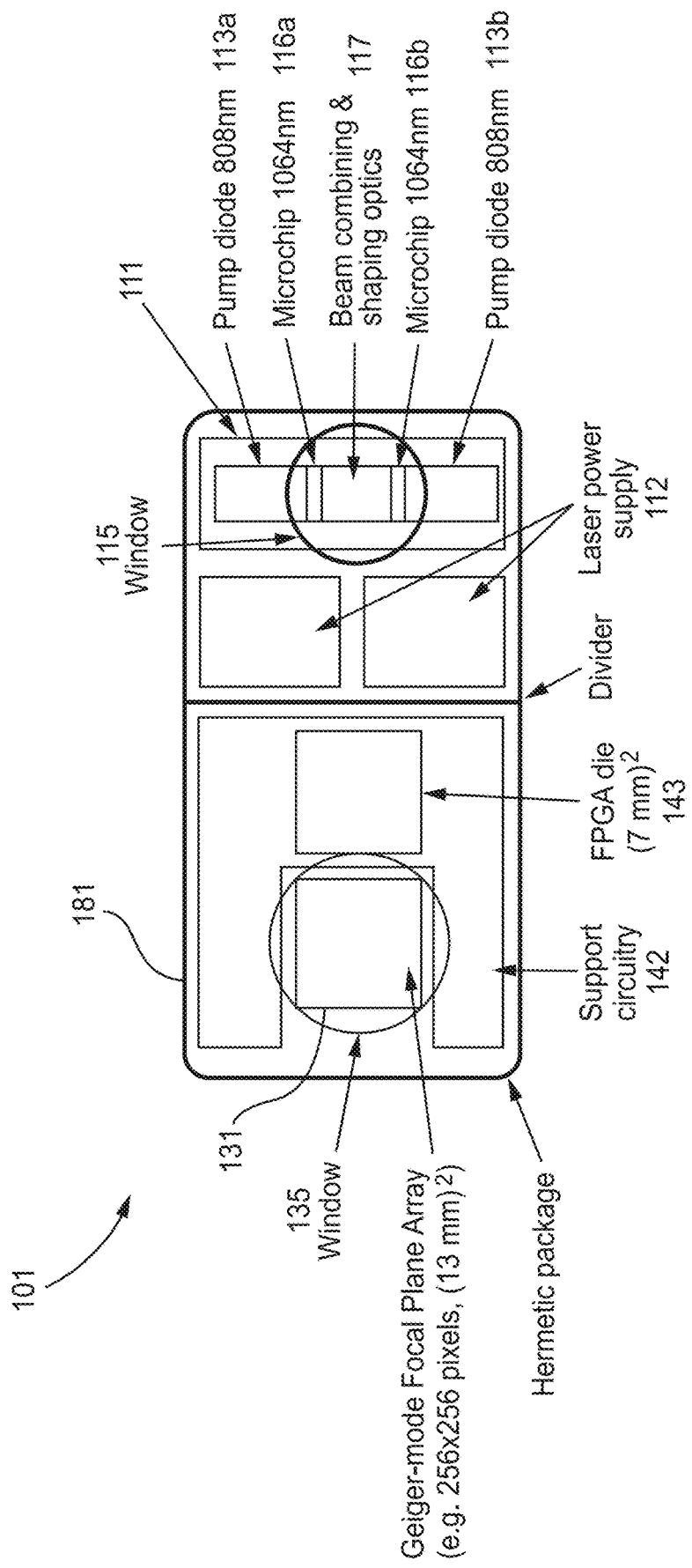
FIG. 1C shows an example LIDAR system including a field-programmable gate array (FPGA).

FIG. 1C shows an example LIDAR system including an FPGA as an embedded processor. The LIDAR system 101 shown in FIG. 1C includes a light source 111, which further includes a power supply 112, a pair of pumping laser diodes 113a and 113b, a pair of microchip lasers 116a and 116b, a beam combining and shaping optic 117, and a transmission window 115. The pair of pumping diodes 113a and 113b can deliver pumping beams at 808 nm to pump the pair of microchip lasers 116a and 116b, which can operate at 1064 nm. The pump diodes 113a and 113b could be driven in a CW mode, resulting in a burst of short (sub-nanosecond) pulses produced by the microchip lasers 116a and 116b. In one example, the burst of short pulses can have a duration (e.g., on the order of milliseconds) matching the duration of the electrical pumping delivered to the pump laser diodes 113a and 113b. In another example, the pump diodes 113a and 113b can be controlled with microsecond-scale timing accuracy, thereby allowing the microchip laser pulse repetition frequency to be more tightly controlled. In yet another example, the microchip lasers 116a and 116b can be pumped continuously. Switching circuitry that accommodates millisecond-scale timing can be small and efficient, whereas microsecond-scale control typically uses bulkier and less-efficient circuitry.

The output beams from the pair of microchip lasers 116a and 116b can be combined and shaped by the beam combining and shaping optic 117. In one example, the beam divergence (in each of two angular directions) can be configured to match the field-of-view of the detector (e.g., focal plane array 131) in the receiver section. In another example, the beam divergence can be smaller, but steerable, so as to illuminate a desired sub-region on the detector array 131. The transmission window 115 can then transmit the beam while maintaining a hermetic seal 181 against contaminants. The transmission window can be coated (e.g., thin films) to block stray pump light. The transmitter section of the LIDAR system 101 can also contain a means to sample the outgoing pulses for time referencing and perhaps pulse energy monitoring.

The LIDAR system 101 also includes focal plane array 131 operably coupled to support circuitry 142 and a FPGA die 143. The FPGA die 143 can be used for on-board processing as described in detail below. The focal plane array 131 can receive light transmitted by the light source 111 and reflected/scattered by the scene through a receiving window 135, which maintains a hermetic seal 181 against contamination. The window can be coated to block ambient light at wavelengths other than the transmitter wavelength.

LIDAR Techniques Including On-Board Data Processing

Figure 2A:
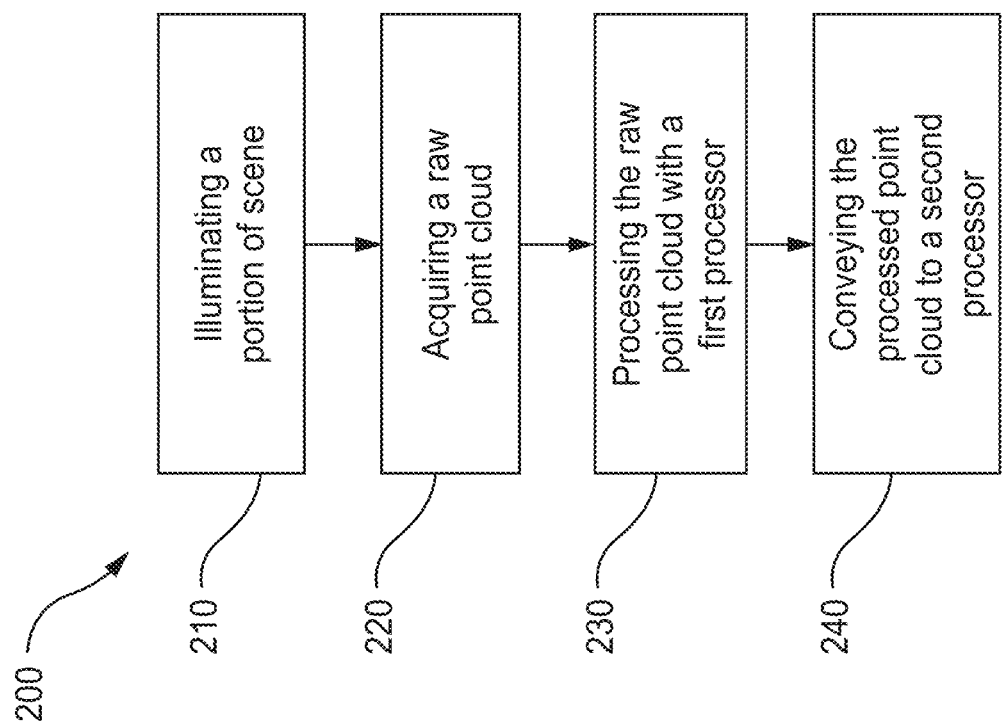
FIG. 2A illustrates 3D imaging techniques including on-board data processing.

FIG. 2A illustrates a LIDAR technique that can allow reduction of the total SWaP of LIDAR systems by using on-board data processing. Photon-counting LIDAR (also referred to as single-photon LIDAR) makes efficient use of each received photon, and thus can be an attractive option for compact systems. However, since the time and location of each detected photon is recorded in photon-counting LIDAR, the data output rates of large focal plane arrays can be very large. Therefore, the infrastructure to transmit data from the detector to processor for 3D image generation can be a dominant fraction of the total SWaP of a photon-counting LIDAR system. On-board processing can reduce the bandwidth required to transfer data off the chip, thereby reducing the weight of the data transmission infrastructure as well as the power consumption to transmit the data.

The method 200 shown in FIG. 2A can reduce the data rate by a factor of about 10 to about 100, thereby substantially reducing system power, weight, and volume. The method 200 starts from step 210, in which a first portion of a scene is illuminated with at least one light pulse. At step 220, at least one raw point cloud is acquired by detecting and recording photons reflected or scattered from the first portion of the scene. A focal plane array (e.g., focal plane array 130 shown in FIG. 1 and discussed above) can be used to acquire this raw point cloud.

The raw point cloud can include several types of data. For example, the raw point cloud can include data points that are generated by photons in the light pulse and represent the distance between the focal plane array and the portion of the scene illuminated by the light pulse. However, the raw point cloud may also include noise data points and/or redundant data points. The noise data points may originate from dark current generated by thermally initiated electron-hole pairs (rather than from the absorption of an incident photon). The noise data points may also originate from reflected photons that are not in the light pulses transmitted by the LIDAR system. For example, the scene can reflect or scatter the sunlight or artificial lighting to the focal plane array, thereby generating data points that typically do not include the distance information useful for 3D imaging. In addition, as discussed above, an avalanche photodiode (APD), when employed as the focal plane array, may also have multiplication noise due to the variation of gain.

The redundant data points are typically generated by photons in the light pulse, but they can be cumulative. In principle, only one photon is needed to derive the distance between the focal plane array and the point which reflects the photon. In practice, on average 10-20 photons are collected for each desired measurement in order to be able to discriminate against background noise and to have high confidence ($P_{det}>0.995$) of detecting any real surfaces present in the scene. The range and intensity (2 numbers) can be derived from the timing information of these 20 photon detection events (20 numbers).

At step 230, a first processor removes at least one noise data point and/or at least one redundant data point from the raw point cloud so as to generate a processed point cloud having fewer data points that the raw point cloud. The first processor can be substantially similar to the embedded processor 140 shown in FIG. 1 and described in detail above. Since the first processor can be integrated with the focal plane array or at least physically close to the focal plane array (e.g., less than 10 inches, 5 inches, 2 inches, or 1 inch), data can be transmitted between the focal plane array and the first processor promptly without sophisticated hardware.

At step 240, the processed point cloud is conveyed to a second processor for further processing including, for example, 3D image registration. The second processor can be substantially similar to the second processor 150 shown in FIG. 1 and described in detail above. Since the processed point cloud typically has a much smaller number of data points compared to the raw point cloud, infrastructure of data transmission between the first processor and the second processor can be much less complicated (and less power consuming), thereby decreasing the SWaP of the entire system.

In one example, the first processor processes the raw point cloud generated by each light pulse at step 230 and then conveys the processed point cloud to the second processor at step 240. In another example, the first processor collects a plurality of raw point clouds generated by a plurality of light pulses and then processes the plurality of raw point clouds simultaneously before conveying the processed point cloud to the second processor at step 240. In yet another example, the first processor can preliminarily process (e.g., remove noise from) each raw point cloud generated by each light pulse but then store the processed point cloud. The first processor can then perform a second processing step to the stored point clouds so as to generate the processed point cloud and convey the processed point cloud to the second processor.

The first processor can process the raw point cloud at step 230 in various ways. In one example, the first processor removes noise data points from the raw point clouds. As discussed above, noise may come from dark current in the focal plane array, photons from sources other than the light pulses (e.g., the sun). These noise data points can have a common feature in that they are typically distributed in time substantially uniformly. Since thermally initiated electron-hole pairs can arise at any moment (e.g., randomly), the detected signal from these thermal electron-hole pairs are accordingly random in time (statistically, the data points can spread uniformly in temporal domain). In contrast, signal data points of interest, which are generated by photons that undergo a round trip between the LIDAR system and scene, are concentrated in time corresponding to the range to the surface which reflects the illumination light back to the receiver. Therefore, the first processor can filter and remove the noise data points by taking advantage of this difference in temporal distributions between signal data points and noise data points.

In another example, the first processor can process the raw point cloud at step 230 by removing redundant data points. As introduced above, redundant data points may come from photons reflected by the same point in the scene. In general, the first processor may find redundant data points by examining the distance information in data points that correspond to a common point in the scene. For a raw point cloud generated by one light pulse, the first processor may find redundant data points by examining the distance information contained in data points collected at the same pixel location. For raw point clouds generated by more than one light pulse, image alignment can be helpful in facilitating redundancy removal.

In yet another example, the first processor can implement coincidence processing steps that can include both noise removal and redundancy removal. Coincidence Processing (CP) generally inputs 3D point clouds generated by detection of single photons, and output estimates of the underlying 3D geometry of a scene, while also reducing noise content. CP can use a non-linear process to reject the noise points and estimate the geometry (and sometimes reflectivity) of the scene using the position and amplitude of these signal concentrations. Advanced CP can address many system non-idealities such as 3D point-spread function, detector blocking, detector saturation, detector responsivity and intrinsic dark count rate, relative illumination intensity, and crosstalk across the array, among others.

Typically the coincidence processing can be accomplished in a 3D gridded space. Voxels with a number of detections attributed to them can be statistically more significant compared to the expected background rate. Such statistical difference can result in an output point in the output point cloud. In one implementation of CP, the voxel size can be smaller than the 3D point spread function (PSF) of the hardware. Each detection event can be attributed to one or multiple voxels, weighted by the PSF. In one implementation, the significance of a detection can be tabulated based upon the known pixel responsivity and relative illumination of that pixel. An expected background rate can be attributed to the voxel as informed by the pixel dark count rate (DCR) and number of times the voxel was interrogated by a pixel that was sensitive.

For example, the first processor can perform a coincidence processing step as following: 1) for a given scene point, identify the set of recorded ranges from one or more light pulses that are reflected by this scene point; 2) examine the recorded ranges and estimate the most probable range; and 3) assign the most probable range to the scene point for 3D image generation. Estimating the most probable range from the plurality of recorded ranges can be based on, for example, statistical analysis.

In yet another example, the first processor executes one or more estimation processes, based on the available measurements, to estimate the location and properties of surfaces in the scene. Properties that may be estimated can include size, reflectivity, pose, polarization characteristics, and motion (speed and vibration). More details can be found in, for example, "Laser Radar: Progress and Opportunities in Active Electro-Optical Sensing" (ISBN 978-0-309-30216-6, from the National Academies of Science), the entirety of which is incorporated by reference herein.

In yet another example, when multiple illumination wavelengths are used, the first processor can conduct spectral analysis of each surface to categorize the data points from each wavelength. In yet another example, the first processor may also detect and track an object, which might be behind partial occlusions from time to time, moving through the scene in 3D.

The method 200 illustrated in FIG. 2A can reduce the SWaP of a LIDAR system by reducing the number of data points that are transmitted for processing. More specifically, the first processor can ingest the photon timing information accumulated from each of many pixel exposures. A pixel exposure can be one pixel "looking at" the scene for one laser pulse. Typically $10^2$-$10^4$ pixel exposures per spatial resolution element are used in photon-counting LIDAR systems. The actual number of pixel exposures may depend on complexity of the scene. In one example, the pixel exposures can be achieved by accumulating output from a single pixel during many laser illumination pulses. In another example, the pixel exposures can be achieved by accumulating outputs from many distinct pixels, each of which is pointed within the same resolution element in the scene and illuminated by just one laser pulse. In yet another example, the pixel exposures can be achieved by a combination of these approaches.

The data rate output from the first processor is typically much less than the raw data rate generated by the focal plane array. For example, a typical photon counting LIDAR interrogating a simple scene (e.g., a flat ground) can be operated such that on average 10-20 photons are detected in each resolution element. The output from the first processor can be a single range value representing the distance between the resolution element and the focal plane array. Therefore, one data point can replace the 10-20 raw data points, thereby achieving a data rate reduction factor of about 10 to about 20.

The data rate reduction rate can be even larger in heavily foliated scenes, which can be of particular interest in, for example, LIDAR-based land surveys. Assuming a canopy obscuration fraction of 90%, the detector may receive 90% of the returned photons from the canopy and only 10% from the ground area of interest. In addition, the canopy and the ground underneath the canopy can have different reflectivities. If the ratio of the reflectivity of the ground surface to the canopy is 1:4, then there can be 40 times fewer photons from the ground than from the canopy. To achieve the desired 10 detections from the ground, the system may record 400 detections from the canopy. These 410 detections can be summarized into only a few surface height estimates by the first processor, thereby achieving a data rate reduction rate of about 100. High reduction or compression can also be achieved in the presence of high background illumination.

Figure 2C:
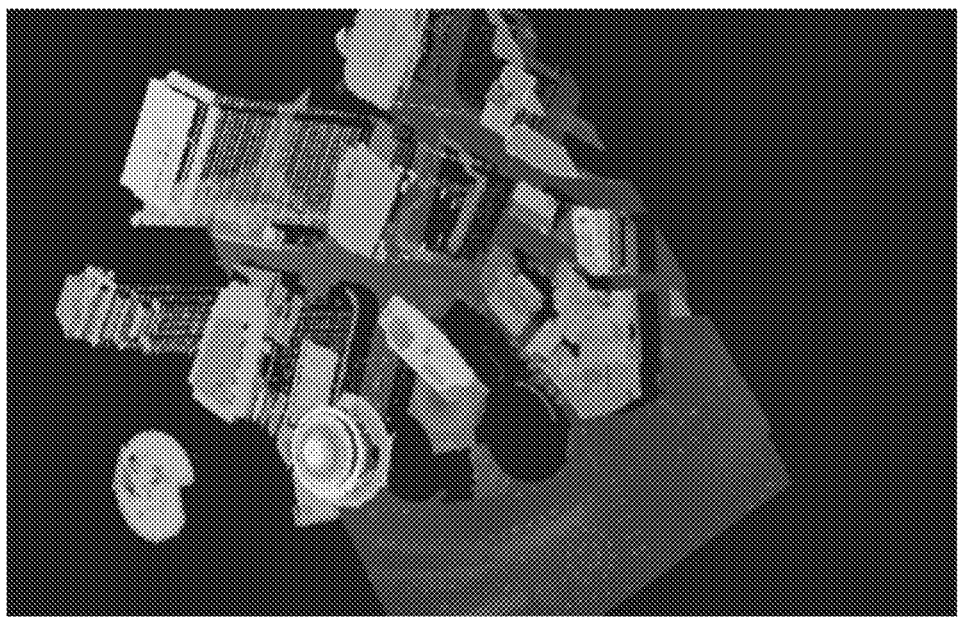
FIGS. 2B and 2C are examples of a raw point cloud and a processed point cloud respectively.
Figure 2B:

FIG. 2B shows a raw point cloud acquired, for example, at step 220 of the method 200. FIG. 2C shows a processed point cloud obtained, for example, at step 240 of the method 200. The processing can remove noise and redundancy as well as increase the sharpness of the point cloud.

FIG. 3 illustrates a LIDAR method 300 which can be helpful in surveying complex scenes such as forest areas. At step 310 of the method 300, a portion of the scene is illuminated by a light pulse. At step 320, a raw point cloud is acquired by detecting and recording photons reflected or scattered from the illuminated portion of the scene. Then the method 300 determines whether sufficient exposure (i.e., sufficient number of photon received) of the portion of the scene is acquired at step 330. Whether sufficient exposure is acquired may depend on several factors, such as the energy (and thus the number of photons) in the light pulse, the complexity of the scene (e.g., whether heavy canopy exists), the reflectivity of the surface of interest, the atmospheric transmission of the photons (e.g., the atmosphere may absorb more photons at one wavelength than another), and the sensitivity of the focal plane array to the photons in the light pulse, among others.

If it is determined that sufficient exposure is acquired, the method 300 proceeds to step 340, in which a first processor processes the raw point clouds by, for example, removing noise and redundancy and performing coincidence processing so as to generate a processed point cloud. If, however, it is determined that the acquired exposure is not sufficient, the method 300 returns to step 310 and illuminate the portion of the scene by another light pulse. This loop may continue until the exposure is deemed to be sufficient. At step 350, the processed point cloud from one or more raw point clouds is conveyed to a second processor for further processing including, for example, 3D image registration.

LIDAR Techniques Using Light Bursts and Sequential Registration

Figure 4:
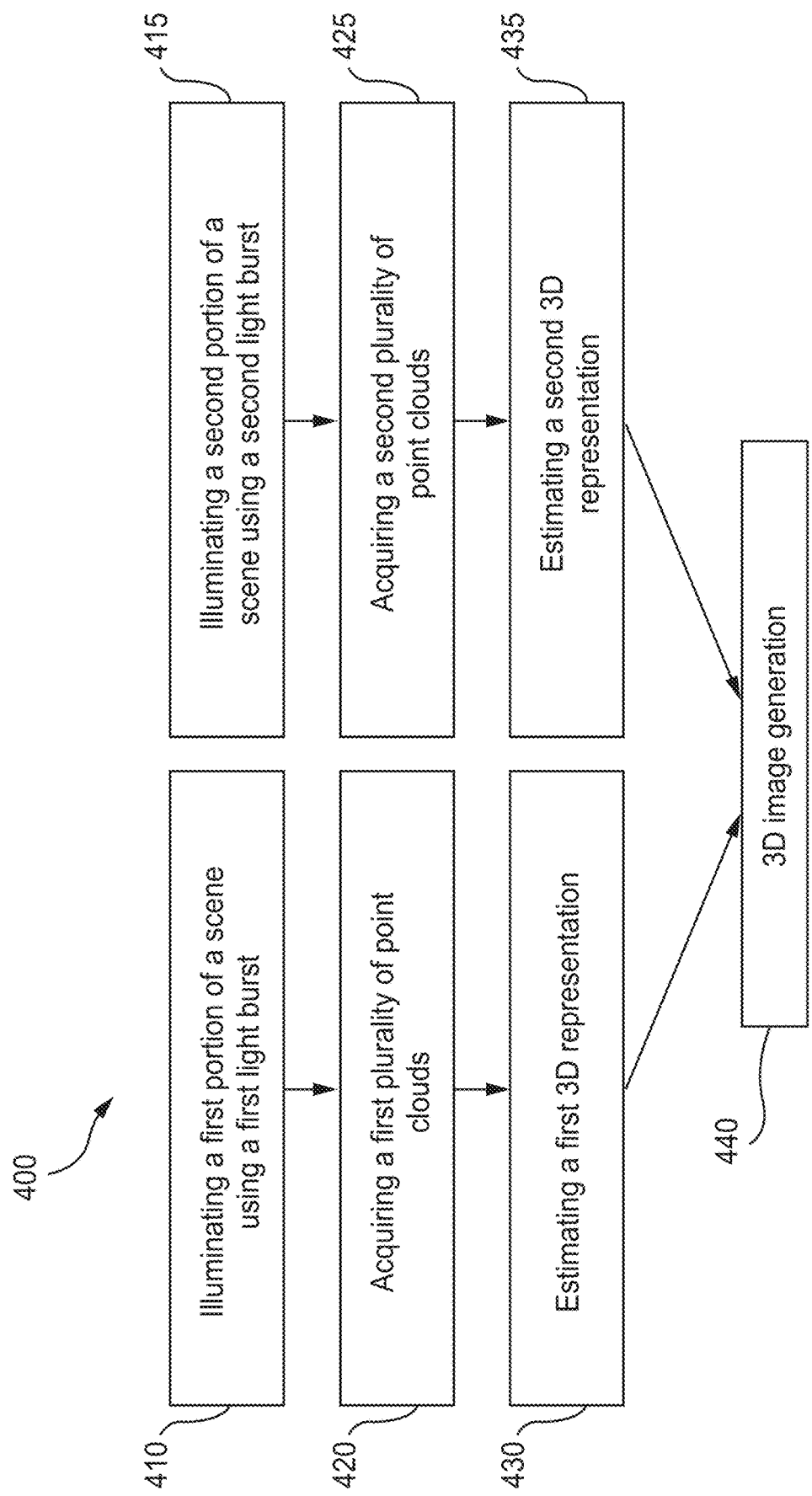
FIG. 4 illustrates LIDAR methods including sequential image registration.

FIG. 4 shows a LIDAR technique which can reduce the total SWaP of a LIDAR system by replacing the otherwise bulky precision opto-mechanical scanner and IMU with sequential 3D registration of the imagery. Instead of registering point clouds with respect to a point whose location is known or can be estimated with high accuracy, such as the scanner, the process 400 shown in FIG. 4 involves registering the point clouds to each other based on overlap among the point clouds. This allows elimination of the opto-mechanical scanner from the LIDAR system. In addition, the bulky IMU can either be removed or replaced by a smaller, lower-performance IMU so that there is still some approximate orientation knowledge.

At step 410 of the method 400, a first portion of a scene is illuminated by a first light burst, which includes a first plurality of light pulses. The total duration of the first light burst is substantially equal to or less than 1 millisecond. At step 420, a first plurality of point clouds are generated. Each point cloud in the first plurality of point cloud corresponds to each light pulse in the first plurality of light pulses. The first plurality of point clouds is generated by detecting photons reflected or scattered from the first portion of the scene using a focal plane array. A first data point in the first plurality of point clouds represents a first distance between the focal plane array and a first scene point in the first portion of the scene. At step 430, a first 3D representation of the first portion of the scene is estimated based at least in part on the first plurality of point clouds.

At step 415 of the method 400, a second portion of a scene is illuminated by a second light burst, which includes a second plurality of light pulses. The second portion of the scene is at least partially overlapping with the first portion of the scene. The total duration of the second light burst is substantially equal to or less than 1 millisecond. At step 425, a second plurality of point clouds are generated. Each point cloud in the second plurality of point cloud corresponds to each light pulse in the second plurality of light pulses. The second plurality of point clouds is generated by detecting photons reflected or scattered from the second portion of the scene using the focal plane array as used in step 420. A second data point in the second plurality of point clouds represents a first distance between the focal plane array and a second scene point in the second portion of the scene. At step 435, a second 3D representation of the second portion of the scene is estimated based at least in part on the second plurality of point clouds.

At step 440 of the method 400, a 3D image of the scene is generated based at least in part on the first 3D representation of the first portion of the scene and the second 3D representation of the second portion of the scene.

Steps 410-430 and steps 415-435 can be practiced in various orders. In one example, steps 415-435 can be performed after the completion of the steps 410-430. In other words, the method 400 estimates the first 3D representation of the first portion of the scene before initiating the estimation of the second 3D representation of the second portion of the scene.

In another example, the method 400 can perform the steps 410 and 420 to acquire the first plurality of point clouds, followed by the performance of steps 415 and 425 to acquire the second plurality of point clouds. Then the method 400 can group process the first plurality of point clouds to generate the first 3D representation and the second plurality of point clouds to generate the second 3D representation.

Although FIG. 4 shows only two estimations of 3D representations of two portions of a scene, in practice, the number of 3D representations to create a complete 3D image of an extended scene can be more than two. If there are more than two 3D representation involved, the 3D image generation can also be performed in various ways. In one example, step 440 can take the first two 3D representations that are available for 3D image generation, while the estimation of more 3D representations is still under progress. In another example, the method 400 can collect all the 3D representations first before generating the 3D image. In yet another example, the method 400 can collect all the point clouds first before estimating any 3D representations, after which the method 400 proceeds to the generation of the 3D image.

The number of light pulses contained in the first light burst and/or the second light burst can be dependent on several factors, including, the energy (and thus the number of photons) in each light pulse, the complexity of the scene (e.g., whether heavy canopy exists), the reflectivity of the surface of interest, the atmospheric transmission of the photons (e.g., the atmosphere may absorb more photons at one wavelength than another), and the sensitivity of the focal plane array to the photons in the light pulse, among others. The number of light pulses can influence the resolution of the resulting 3D image of the scene. In general, larger number of the light pulses in each burst can lead to a higher resolution. In one example, each light burst can include about 2 to about 1000 pulses. In another example, each light burst can include about 5 to about 500 light pulses. In yet another example, each light burst can include about 20 to about 50 light pulses.

The first light burst and the second light burst can include different numbers of light pulses. For example, the first portion of the scene might be more complex or have a different surface than the second portion of the scene. Therefore, the first light burst may contain 20 light pulses while the second light burst contains only 5 light pulses.

The pulse duration of each light pulse in the light bursts can be short so as to allow a light burst to contain a large number of light pulses. In one example, each light pulse has pulse duration less than 5 ns. In another example, each light pulse has pulse duration less than 1 ns. In yet another example, each light pulse has pulse duration less than 500 ps, 200 ps, or 100 ps. In yet another example, femtosecond light pulses (pulse duration <1 ps) can be employed.

The focal plane array used in steps 420 and 425 can be substantially the same focal plane array 130 shown in FIG. 1 and described in detail above. More specifically, the focal plane array can include, for example, an avalanche photodiode (APD), a Geiger-mode APD, a superconducting nanowire single-photon detector (SNSPD), a transition edge sensor (TES), a scintillator counter, a charge-coupled device (CCD) or complementary metal-oxide semiconductor (CMOS) array, among others.

The focal plane array can also include an array of Geiger-mode APDs or other single-photon detectors. In one example, the focal plane array can include an array of APDs including at least 16 rows and 16 columns. In another example, the array can include an array of APDs including at least 64 rows and 64 columns. In yet another example, the array can include an array of APDs including at least 128 rows and 128 columns.

The data points in the first plurality of point clouds and the second plurality of point clouds can include the time of flight information of the detected photons so as to derive the distance between the focal plane array and the respective portion of the scene. The data points can also include location information of the pixels at which the photons are received. This location information can be helpful in subsequent estimation of 3D representations and 3D image generation.

In one example, the first 3D representation and the second 3D representation can be generated via the embedded processor 140 shown in FIG. 1 and described in detail above. In this case, estimation of 3D representation can be performed on-board, thereby further reducing the total SWaP of the resulting LIDAR systems. In another example, the 3D representations can be generated after the collection of all point clouds by an off-board processor. The 3D representations can be generated using the coincidence processing technique described above. In addition, the estimation can be performed in an angle-angle range coordinate frame (i.e. aligned to optical rays traced outward toward the scene from each pixel in the focal plane array), without the necessity to calculate the Cartesian coordinates as typically required in LIDAR techniques.

In one example, the 3D representations are processed point clouds. Each data point in the point cloud represents a location of a point in the scene and the distance between the point and the focal plane array. In another example, the 3D representation can be 3D images of the respective portion of the scene. Data points in the 3D representations can represent the location of the points in the scene and the surface properties of the points. The surface properties may include, for example, elevation of the point and type of the point (ground, canopy, ice, asphalt, etc.).

The first portion of the scene illuminated at step 410 is at least partially overlapping with the second portion of the scene illuminated at step 415 so as to allow sequential registration of images. In one example, the first portion of the scene is overlapping with the second portion of the scene by about 30% to about 60%. In another example, the overlapping percentage can be at least 50%. In yet another example, the overlapping percentage can be at least 70%. The overlapping percentage can be dependent on, for example, the number of resolution elements (i.e., element in the scene mapped to one pixel in the detector) in the scene. In general, a larger number of resolution elements in a portion of the scene can result in lower overlapping percentage requirement.

In one example, the first plurality of point clouds are taken when the focal plane array is at a first location, while the second point clouds are taken when the focal plane array is at a second location different from the first location. For example, in airborne LIDAR, the plane may survey a scene along a straight line, and each plurality of point clouds can be taken at a different location along the straight line. In another example, the first plurality of point clouds are taken when the focal plane array is at a first orientation, while the second point clouds are taken when the focal plane array is at a second orientation different from the first location. For example, in a ground-based LIDAR, the focal plane array can be tilted toward different portions of a scene so as to cover a wide area. In this case, each plurality of point clouds can be taken when the focal plane array is at a different orientation. In yet another example, both the location and the orientation of the focal plane array can be different. For example, in an airborne LIDAR, the plane may fly around a tree to take point clouds at different angles toward the tree so as to collect more photons reflected from the ground underneath the tree. In this case, each plurality of point cloud is taken while the focal plane array is at a different location (e.g., location along a periphery above the tree) and a different orientation (e.g., tilting).

The 3D image generation at step 440 can employ the sequential image registration technique since adjacent portions of the scene are overlapping. The sequential image registration can compare two individual 3D representations and find out the overlapping region, after which the two individual 3D representations can be aligned together and form an image of a larger portion, i.e., the sum of the first portion and the second portion. The process can continue until the entire scene of interest is covered. Sequential image registration can take advantage of the relative location of each data point in the point clouds, without the necessity to know the exact and absolute geolocation of the each data point. Therefore, the bulky precision opto-mechanical scanner and the IMU, which are conventionally employed to derive the geolocation of the data points, can be eliminated. The total SWaP of the resulting LIDAR system can be accordingly reduced. At step 440, coincidence processing can also be optionally performed in the overlapping region between the two or more individual 3D representations so as to further reduce noise/redundancy and improve accuracy.

Although exact geolocation of each data point in the point clouds is not necessary to produce the final 3D image, geolocation information can still be derived so as to allow the georeferencing of the 3D image. In one example, one point in the 3D image can be georeferenced using a GPS, for example, at the beginning or end of the data acquisition process. The rest of the points in the 3D image can be derived based on this georeferenced point since the relative location between the rest of the points and this georeferenced point is known. In this case, the entire 3D image can still be georeferenced without the bulky opto-mechanical scanner and the IMU.

Figure 5:
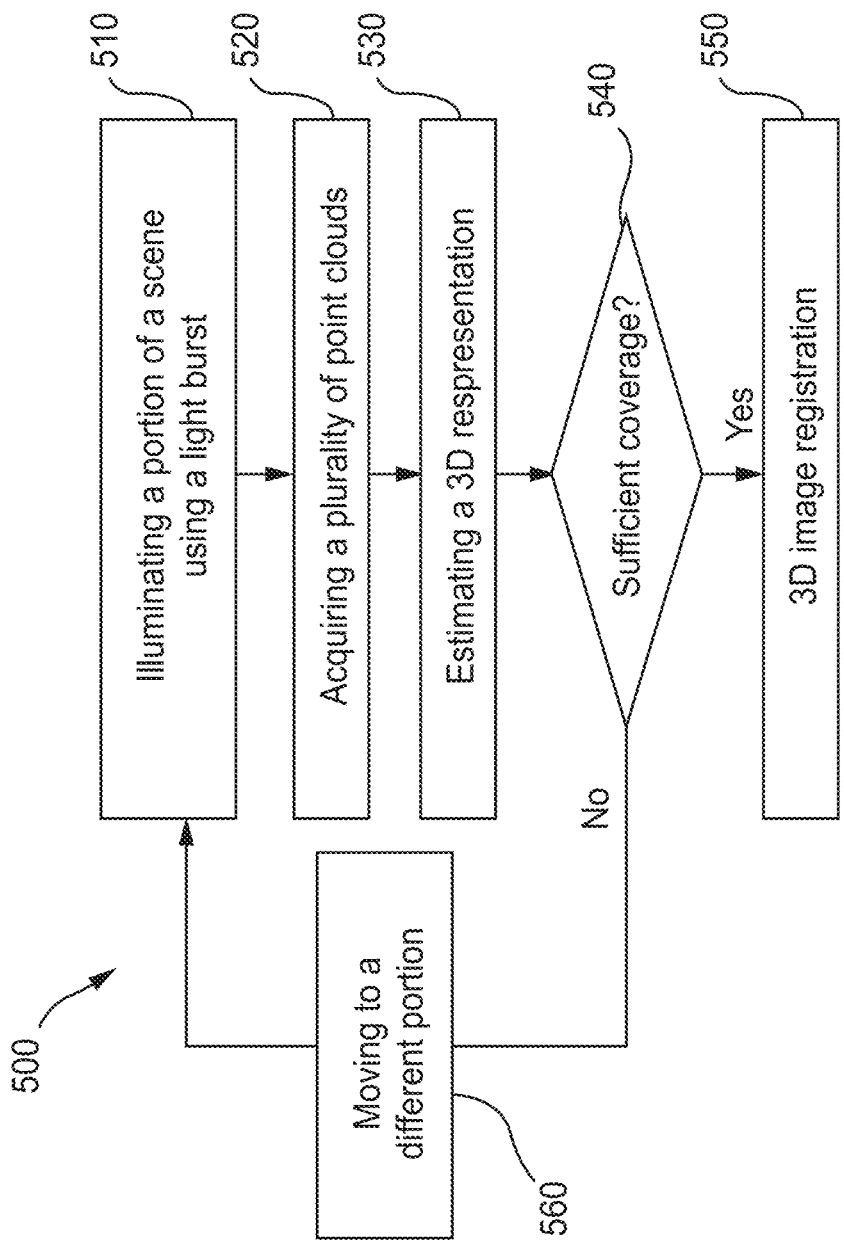
FIG. 5 illustrates LIDAR methods including sequential image registration to cover a wide-area scene.

FIG. 5 illustrates a method of imaging a wide area scene. The method 500 starts by illuminating a portion of a scene using a light burst at step 510, followed by acquiring, at step 520, a plurality of point clouds corresponding to the plurality of light pulses contained in the light burst. At step 530, the plurality of point clouds is processed so as to estimate a 3D representation of the portion that was illuminated at step 510. At step 540, the method 500 determines whether sufficient coverage has been made with respect to the scene, i.e., whether sufficient area of the scene has been imaged. If not, the method proceeds to step 560 at which the LIDAR system is moved to a different portion of the scene and repeats steps 510 to 540 until sufficient coverage is completed. Moving to a different portion can be achieved by, for example, moving the focal plane array to a different location, a different orientation, or both. If the coverage is deemed to be sufficient at step 540, the method proceeds to step 550 to generate the 3D image of the scene using the generated 3D representations.

At least due to the reduced SWaP, the entire LIDAR system implementing the methods illustrated in FIGS. 4 and 5 can be as small as the size of a child's thumb. More specifically, the physical device can be a small package (e.g., 10 cc, but could be larger or smaller) containing a microchip laser, a focal plane array of avalanche photodiodes operating in Geiger-mode (GmAPD FPA), and a computing device such as a field programmable gate array (FPGA), digital signal processor (DSP), or application specific integrated circuit (ASIC). One window in the physical device can transmit the laser radiation out, and the other window, ordinarily placed behind a focusing optic, transmits the return signal to the detector array. The device operates in a burst mode, in which a sequence of laser pulses illuminates the scene at a pulse repetition frequency (PRF) consistent with efficient laser operation and achievable readout rates of the detector array. A typical PRF can be, for example, about 10 kHz to about 200 kHz, or about 20 kHz to about 100 kHz, or about 30 kHz. A typical burst length can be, for example, 1 msec. The burst length can be sufficiently short so that elements in the image move less than a significant fraction of a pixel during the burst.

The detector array records pixel firing times (and therefore round-trip light travel times, and therefore range) for each pulse. This timing information and the resulting range information can be aggregated together in a processing element over the duration of the burst. Once the burst is complete, the laser and detector array can be transitioned to a low-power standby mode until the next burst is fired.

During this inter-burst interval the processor can remove redundancy and noise so the data volume for the burst is reduced by a factor of $10^1$-$10^2$ depending on the scene type and fidelity requirements. The data for the burst can be transferred to an output buffer and streamed off the device during the next burst and processing interval. The burst can be issued, notionally, after the sensor field-of-view (FOV) has moved a significant fraction of the FOV. Accelerometers or other sensors can be employed to measure this movement. Once the imagery data is offloaded from the sensor (and perhaps the platform), it can be aligned to images from preceding (and perhaps following) bursts using 3D registration techniques. Taken together, many hundreds of bursts can form a clean and usefully-large image.

The above approach can be of particular significance in applications where sensor SWaP is constraint. To make 3D registration succeed, the scene imaged in a single burst can contain many features (resolution elements) with characteristic sizes on the order of the desired data resolution. This may help determine a lower bound on the size of the individual image chips. For example, if 30 spatial resolution elements are desired in each direction, a total of approximately $10^3$ resolution elements are desired in the image chip. Given an assumption about angular slew rates or platform speeds, there can be also an upper bound on the inter-burst period so as to allow at least partial overlapping between sequential image chips.

LIDAR Techniques with Configurable Area of Interest

Figure 6:
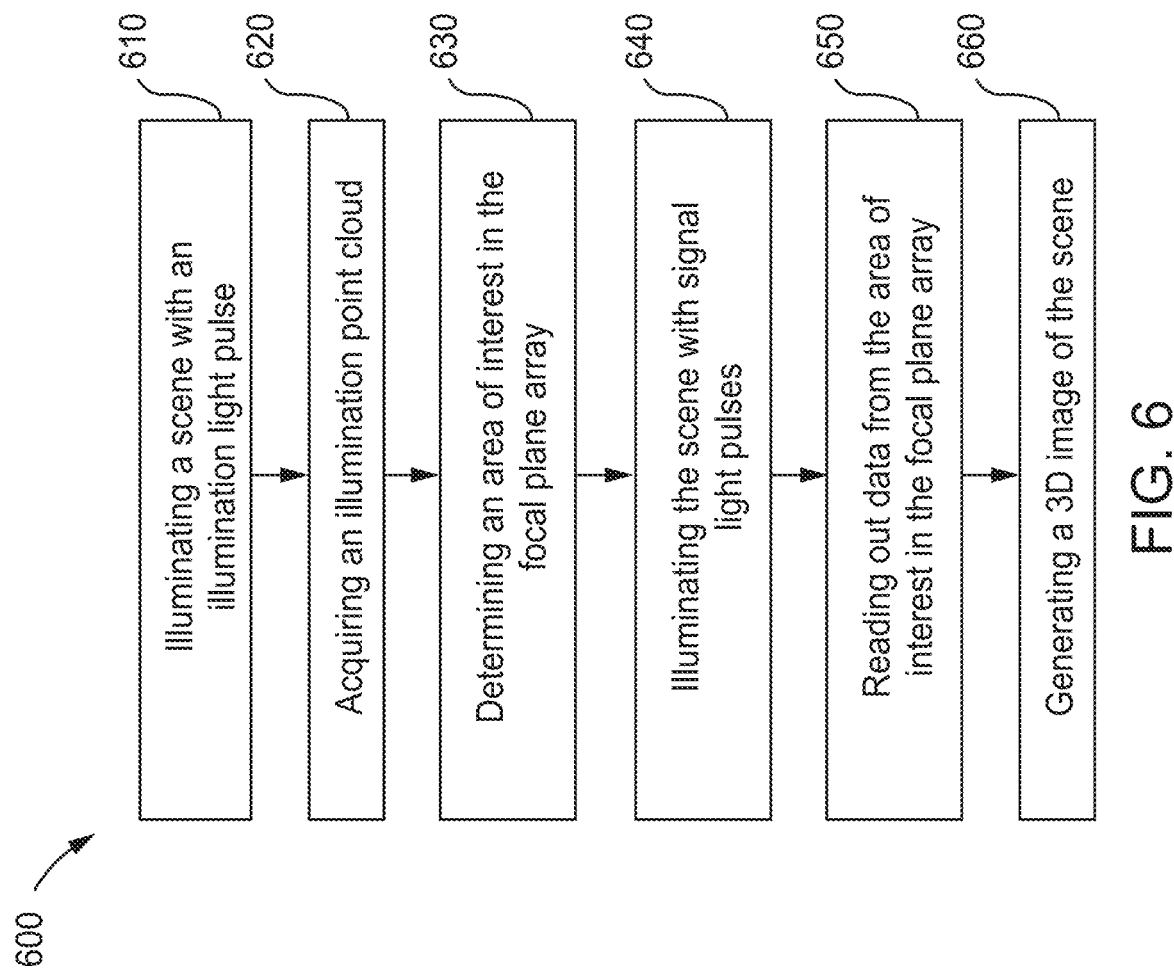
FIG. 6 illustrates LIDAR techniques including configurable field of interest.

FIG. 6 illustrates a LIDAR method which can be efficient in situations when the image quality requirements may vary dramatically across the array field of view (FOV). The method can also be useful when the target scene or object is relatively small, or the size of the target scene or object is unknown before the measurement.

The method 600 shown in FIG. 6 starts from step 610, at which a scene is illuminated by an illumination light pulse, followed by acquiring, at step 620, an illumination point cloud from photons in the illumination light pulse reflected or scattered from the scene using a focal plane array. At step 630, an area of interest in the focal plane array is determined based at least in part on the illumination point cloud. The area of interest can be a subset of the entire focal plane array. At step 640, the scene is illuminated by a plurality of signal light pulses. For each signal light pulse in the plurality of signal light pulses, a respective signal point cloud is acquired by reading out data from the area of interest in the focal plane array, as performed at step 650. At step 660, a 3D image of at least a portion of the scene is generated based at least in part on a plurality of signal point clouds from the plurality of signal pulses acquired in step 650.

In one example, the divergences of the illumination light pulse and the signal light pulse can be the same and delivered by the same light source (e.g., the light source 110 show in FIG. 1 and described in detail above). In another example, the illumination light pulse and the signal light pulse can have different divergences. For example, the illumination light pulse can have a larger divergence such that the reflected light can illuminate the entire focal plane array. The signal pulse, however, can have a smaller divergence only to cover the area of interest in the focal plane array determined by the illumination light pulse. The signal pulses may be steered to a region of interest as directed by a system controller, based in part on initial analysis of the illumination point cloud or cues from other sensors. Photon detections that are useful for creating a 3D image may only come from the region of the entire focal plane array that is illuminated by the signal light pulse. For the illuminated region, data can be read out in a manner that preserves the fine timing detail. The remainder of the array can also be read out, but without the high precision timing information, so the electrical power and data communication bandwidth can be reduced.

The readout region of interest can occupy different percentages of areas in the focal plane array. In one example, the area of interest is about 1% to about 10% of the area of the focal plane array. In another example, the area of interest can be less than 1% of the area of the focal plane array. In yet another example, the area of interest can be less than 20% of the area of the focal plane array.

The number of signal pulses in the plurality of signal pulses can be dependent on the desired exposure of the scene, or the desired resolution, or the scene complexity (e.g. the presence of heavy foliage). In general, a larger number of signal pulses illuminating the scene can lead to a higher resolution of the resulting images. In one example, the plurality of signal light pulses comprises at least 5 signal light pulses. In another example, the plurality of signal light pulses comprises about 5 to about 20 signal light pulses. In yet another example, the plurality of signal light pulses comprises about 5 to about 100 signal light pulses.

The region of interest to be read out in the high-precision timing mode can be determined by, for example, counting a number of photons received at each pixel or group of pixels in the focal plane array and then determining the area of interest based at least in part on the number of photons at each pixel or group of pixels in the focal plane array. In general, a higher density of photons concentrated in a region tends to indicate that the region was illuminated by the signal light pulse and is an area of interest. The number of photons can be counted within a predetermined time window, such as a time window within which all photons reflected by the scene are expected to return to the focal plane array.

Although FIG. 6 shows only one 610 illumination pulse, in practice, the number of 610 illumination pulses employed to determine the area of interest can be more than one. For example, a second illumination pulse can be helpful when the first image generated by the first illumination pulse does not capture the target scene sufficiently (e.g., because the first illumination pulse misses the target or because the signal level is low).

In addition, the area of interest in the focal plane may change during the data acquisition in imaging the scene. For example, the focal plane array may be disturbed and dislocated from its original location or orientation. In this case, it can be helpful to re-determine the area of interest. In another example, the focal plane array can be mounted on an airborne platform which scans a scene by flying over the scene. In this case, it can be helpful to periodically check the area of interest during the flight so as to update the area of interest.

In yet another example, two illumination pulses of different sizes (divergences) can be employed to the illuminate the scene and determine the area of interest. For example, a small beam can be used to generate a large number of photo-detections (e.g., 10-50) for each of a number of small pixels, resulting in high resolution 3D imagery, while a large beam can illuminate a larger area, but collect enough photon-detections only when aggregated into coarser resolution (e.g., larger) pixels. These coarse images can be used for coarse range determination and target acquisition. The wide and narrow beams can be multiplexed (e.g., one burst with the wide beam, several bursts with the narrow beam) to determine the next area of interest to illuminate.

LIDAR techniques with configurable area of interest can reduce the total SWaP of a LIDAR system by eliminating the bulky opto-mechanical scanners and IMU, while simultaneously limiting the sensor data volume. More specifically, active imaging systems such as LIDAR expend power illuminating, sensing, and processing imagery. In general, different parts of a large scene can have different reflectivities and different scene complexity. Therefore, it generally takes different numbers of interrogations to achieve the desired imaging performance for these different parts. To reduce power usage, it can be helpful to limit the integration time devoted to each region of a scene while achieving the desired product quality. The desired product quality may take account of factors such as scene complexity and spatial resolution. For example, less integration time is typically needed to form a useful image of a flat grass field than to detect objects under heavy canopy. The integration time per unit area can depend on, for example, the reflectance of the surface, the obscuration fraction, the desired spatial resolution, and the number of surfaces present within a spatial resolution element, and the acceptable rate of false positives and false negatives output from the signal processing chain.

Additionally, in some applications where the LIDAR is cued by another sensor, normally only a small sub-region of a scene is of any interest. In general, the desired integration time per unit area can be a function of position within the addressable sensor field of regard (FOR). To make efficient use of the available laser power and detector pixels, typical LIDAR systems use a precision pointing and scanning system to direct a narrow sensor field of view to the intended region of the sensor's complete FOR. As introduced above, this precision pointing system typically comprises a significant fraction of system SWaP.

In contrast, the LIDAR method shown in FIG. 6 and the physical system implementing the method can eliminate the precision pointing systems, thereby reducing the SWaP. The LIDAR system can include a pulsed light source (e.g., a laser) that illuminates only a small fraction of the large array, a lightweight mechanism for pointing the light pulse to a desired region of the Field-Of-Regard (FOR), a method for reading out only those pixels illuminated by the light pulse, and a method of processing those data into imagery. Because the laser illuminates only a small fraction of the large array, the laser power can be small. Because the spatial information about the scene is captured by pixels with a known, precise relative angular position, the laser pointing can be less precise compared to the pointing mechanism conventionally used in LIDAR systems. Because the angular width of the light pulse can be 10 times to 30 times wider than the receiver angular resolution, the diameter of the laser scanner can be 10 times to about 30 times smaller than the diameter of the receiver aperture. Because only the pixels illuminated by the laser are read out, the power consumption of the receiver can be less than what would be otherwise required if the entire array were to be read out. Because only those pixels containing scene information are passed to the processing system, the power and resource requirements of that processor can be substantially reduced.

The receiver optics in a free-space optical link is typically pointed at the transmitter. The pointing control accuracy required is normally the greater of either the diffraction limited angular resolution of the receiver, $\lambda/D$ ($\lambda$=wavelength, D=aperture diameter), or the field-of-view of the focal plane array. To allow relaxed pointing control, the focal plane array can be made as large as possible. However, with increasing size, the power consumed to read out all the pixels can become substantial. The approach described in this section allows only the pixels of interest to be read out, thereby allowing the focal plane array size to be scaled up while maintaining a relatively low power consumption.

To facilitate a quantitative description of the approach, the following terms are defined, without being bound by any particular theory or mode of operation.

An image size describes the angular subtense, as viewed form the LIDAR sensor, of the object being imaged. Alternatively, the image size may be understood as the number of spatial resolution elements across the object. For example, suppose an object of a characteristic size S is being imaged from an airborne platform at a range R. The angular subtense is then $\tan^{-1} S/R$. Given a desire to resolve features of size f, the image size is $N_f = S/f$. The number of resolution elements in the image is $N_f^2$.

The size of the focal plane array is characterized by the number of pixels along a linear dimension, $N_x$. For a square array the number of pixels is $N_x^2$. The angular subtense of each pixel $\varphi$, multiplied by the number of pixels, gives the total array field-of-view (FOV): $\Phi = N_x \varphi$.

The field-of-regard (FOR) is the total angular width over which the sensor can be pointed. A typical LIDAR can be scanned over an angular width $\theta = \pm 20°$.

The term "flood illumination" is typically employed to describe the situation in which the majority of the pixels are illuminated by the laser and the laser and focal plane are pointed in concert. If only a small fraction of the pixels are illuminated by the laser, the term "spot illumination" is used.

LIDAR systems can be categorized in terms of the relative values of these size scales, including the typical image size $N_f$ this is desired, the typical angular width $\theta$ of the scene, and the total array field of view $\Phi$, as summarized in Table 1. The approach described in this section can improve cases wherein $\Phi > N_f$, i.e., the focal plane FOV is wider than the desired image size. Improvement occurs at least because the laser illumination, detector readout, and processing resources can be devoted proportionately to just those parts of the FOV requiring more signal integration. Also, the receiver does not need to be slewed to the region of interest since its focal plane field-of-view is wide enough to cover the entire scene. Existing LIDAR systems of these types (i.e. employing a focal plane array of detector pixels) normally employ flood illumination, whereas the approach here employs spot illumination. Because of the power savings allowed by this approach with a configurable area of interest, it is feasible to scale up the size of the detector array, thereby eliminating the need for a scanning system on the receiver (the signal pulses can still be steered to the desired region of interest, but the steering can be performed with lower precision and with a smaller scanner, at least because the beam is smaller).

TABLE 1

Categorization of LIDAR Systems

| Relative Size | Typical Application | Pointing/ Scanning Requirements | Allowable Integration Time |
|---|---|---|---|
| $N_f > \Phi > \theta$ | Wide-area mapping: pushbroom | No scanning; high precision knowledge | Medium |
| $N_f > \theta > \Phi$ | Wide-area mapping: scanned | High precision knowledge | Short |
| $\theta > N_f > \Phi$ | Targeted imaging: scanned | High precision knowledge | Short |
| $\theta > \Phi > N_f$ | Targeted imaging: staring | Low precision knowledge | Long |
| $\Phi > \theta > N_f$ | Cued interrogation | Low precision knowledge | Long |
| $\Phi > N_f > \theta$ | Cued interrogation | None | Long |

To facilitate the implementation of the LIDAR techniques with configurable field of interest, the detector readout integrated circuit (ROIC) can include one or more of the following features: 1) precision timing of photon arrivals is only measured in a sub-region of the array, thereby reducing total power consumption; 2) time-gated photon counting is conducted in the non-ROI areas of the detector; the reduced bandwidth requirements of these circuits allows the circuits to be run at lower voltage, and therefore reduced leakage current and power; and 3) the time-gated photon counting can be used to maintain track on the signal laser beam and select the pixel ROI for precision timing.

Optical Field-of-View (FOV) Multiplexer

Optical imaging systems, including LIDAR systems, generally focus light onto an array of detectors. If the desired system field of view (FOV) is wider than a single detector array FOV, then multiple arrays are combined in some way.

One way for combining multiple FPA FOVs in an imaging system is based on placing multiple FPAs in the image plane. One problem with this method is the gap between the FPAs: either the arrays must be abuttable or there are losses and image artifacts in the seams. For light-starved applications in which all the light collected by the aperture should be exploited (such as active illumination systems or low-light imagers), these losses can be undesirable or even unacceptable. In principle any detector FPA can be made four-side abuttable, but the associated engineering challenges are substantial.

Another method to combine multiple FPA FOVs is scanning. An aperture illuminating a single FPA can be scanned over a wide field of regard (FOR) while recording precision pointing measurements. In post-processing the measurements are stitched together into a mosaic. In this method the integration time per unit solid angle is reduced to accommodate the scanning. Additionally, the scanning mechanism typically needs to be as precise as the intended image resolution. Finally, in active illumination systems the laser beam is matched to the single FPA FOV and co-scanned. The beam divergence is tighter and eye safety considerations are more severe.

These challenges can be addressed, at least partially, by an optical FOV multiplexer which uses an optical system to deflect the image from various portions of the focal plane to detector arrays placed far apart from each other. Additionally, various portions of the image can be routed to different optical systems for purposes such as polarimetry, foveated imaging, and dynamic range accommodation.

Figure 7:
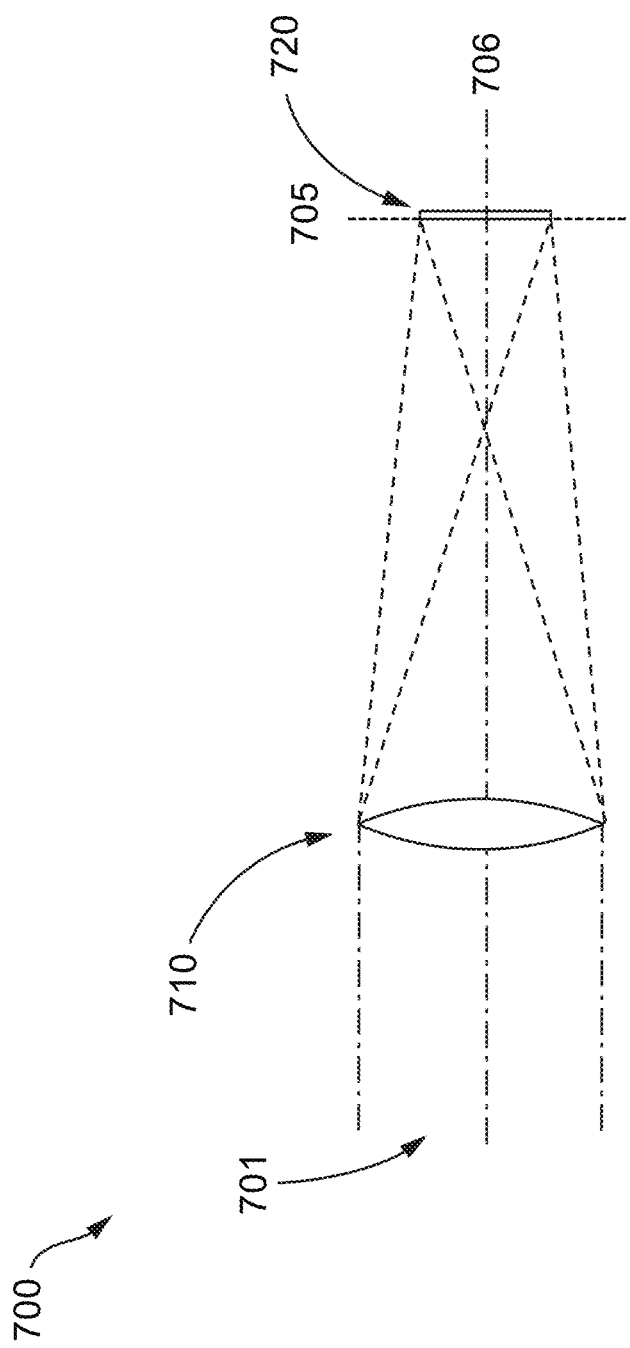
FIG. 7 shows a schematic of an example optical imaging system suitable for use in a LIDAR system like the one shown in FIG. 1A.

An optical system focuses light onto a focal plane. One example can be a simple convex lens as shown FIG. 7. The optical system 700 includes a focusing optic 710 (i.e., convex lens in this example) that focuses an incident beam 701 onto a detector array 720 centered on the optical axis 706 and located at the focal plane of the lens 705. This optical system can be characterized by an f-number, N=f/D, where f is the effective focal length of the focusing optic 710 and D is the effective diameter of the focusing optic 710. For an object at infinity, the image is formed at the focal plane 705, a distance f from the lens. The focus is considered good near the focal plane within the so-called depth of focus, $\Delta=\pm 2\lambda N^2$. Typically a focal plane array (FPA) 720 of detectors is placed at the focal plane; this array can be characterized by a number of pixels in each of two directions (e.g. $N_x$ and $N_y$) and a pixel pitch in each of two directions (e.g. $\Lambda_x$ and $\Lambda_y$). The angular FOV of an array centered on the optical axis is then limited to $\Phi=2 \tan^{-1}(N_x \Lambda_x/2f)$. In order to image a wide FOV, a large FPA (large $N_x$) can be helpful. Large FPAs are often difficult to manufacture and are expensive, whereas several smaller FPAs are more readily available. It is therefore often desirable to combine together several smaller FPAs within the same system. If the arrays are abuttable, (i.e., a pixel on one device can be placed immediately next to the pixel of a neighboring device without empty space), then smaller arrays can be tiled together in the focal plane. However, abuttable detector arrays are often not available.

Figure 8:
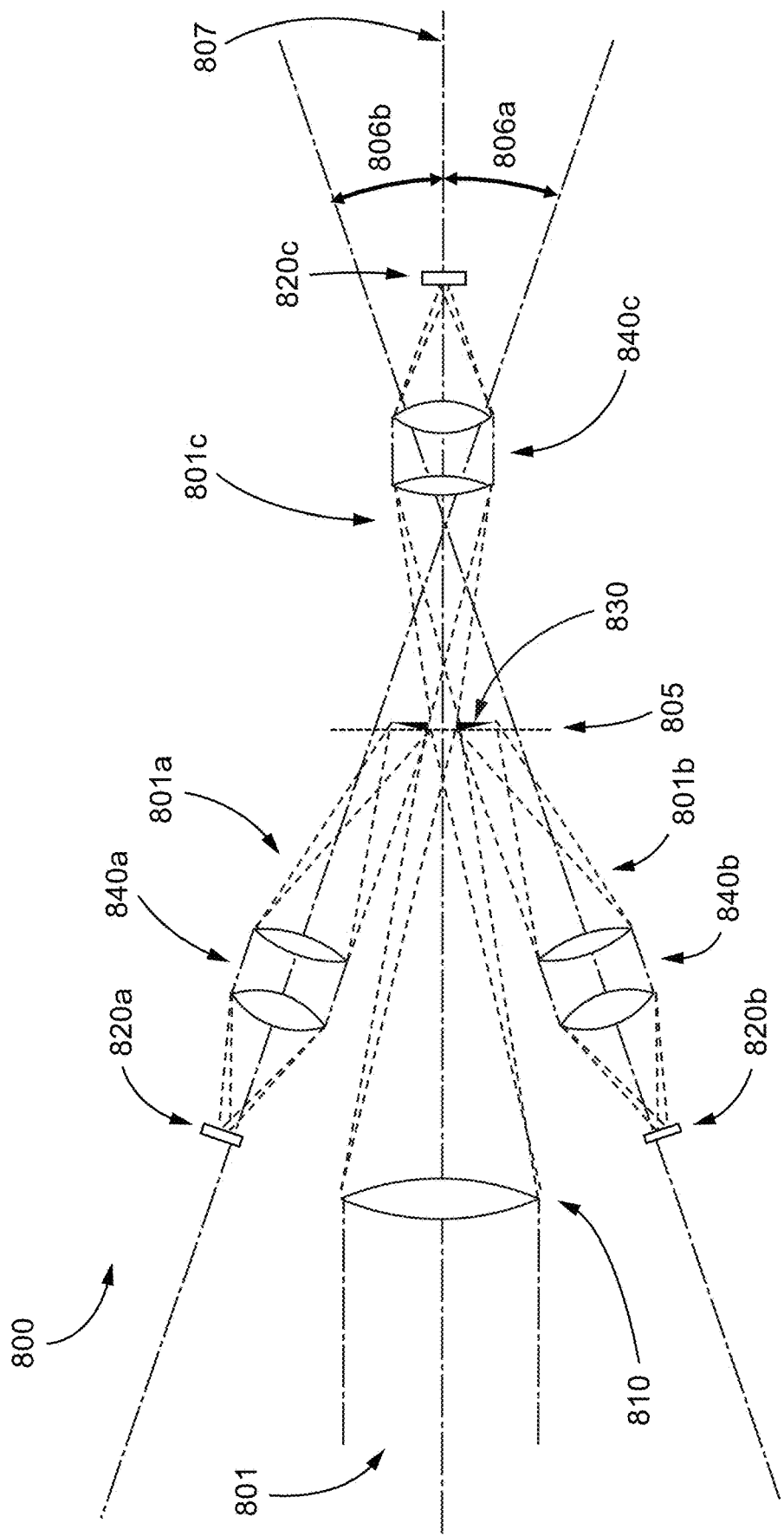
FIG. 8 shows a schematic of an optical system including an optical field-of-view (FOV) multiplexer suitable for use in a LIDAR system like the one shown in FIG. 1A.

FIG. 8 shows an optical system including an optical FOV multiplexer with an increased FOV by using additional non-abuttable FPAs without suffering seam losses. The system 800 includes a focusing optic 810, such as a lens or curved mirror, which focuses an incident beam 801 toward the focal plane of the focusing optic 810. A set of splitting optic 830 is disposed at the focal plane of the focusing optic 810 to split the beam 801 into three components: a first component 801a, a second component 801b, and a third component 801c. The first component 801a and the second component 801b are reflected toward a first detector array 820a and a second detector array 802b, respectively. The third component 801c is transmitted through the splitting optic 830 and propagating toward a third detector array 820c. Each component (801a-801c) is transmitted through a respective refocusing optic 840a-840c so as to be properly focused on the respective detector array.

The splitting optic 830 as shown in FIG. 8 includes a plurality of deflecting elements, e.g., prisms or wedge mirrors in this example. Each prism or wedge mirror can have a size smaller than $(N_x \Lambda_x)$ and is placed at the focal plane 805 of the focusing optic 810. In some cases, the prisms or wedge mirrors may be aligned and/or tilted with respect to the focal plane in order to reduce misfocus and other aberrations in the images sensed by the detector arrays 820a-820c.

In order to deflect the light out of the incident light cone, the deflection angle α 806a and 806b with respect to the optical axis 807 can be greater than the width of the light cone focusing onto the focal plane: $\alpha \geq \alpha_{min}$. In the limit that the distance between the optical axis and the deflecting element is negligible, $\alpha_{min}=2 \tan^{-1}(D/2f)=2 \tan^{-1}(\frac{1}{2}N)$. In order to suppress vignetting of adjacent image tiles, the deflecting element may not protrude more than a distance Δ from the focal plane at a wedge edge. For the configuration in FIG. 8 with only two wedges, the edges closest to the optical axis can be placed at the focal plane.

For more general arrangements with many wedges, the non-vignetting condition may lead to a limitation on the angular width of the light cone. Consider a flat mirror of size $(N_x \Lambda_x)$, deflecting at an angle $\alpha_{min}$. If the center of the mirror is placed on the focal plane, each edge will protrude by approximately $(N_x \Lambda_x)\alpha/2$. Using αmin and a small angle approximation, the minimum system f-number can be $N_{min}=(N_x \Lambda_x/8\lambda)^{1/3}$. Inserting numbers for a typical small detector FPA with $(N_x \Lambda_x)$=10 mm, and operating wavelength λ=1 μm, $N_{min}$ can then be derived as 11. To relax this f-number constraint, a single flat mirror can be replaced with a stepped mirror (e.g., similar to a Fresnel lens), with each facet at the desired angle but much shorter. Alternatively, some vignetting may be tolerated. Once the light has been deflected out of the incident light cone, it is then refocused onto the intended detector FPA.

Figure 9:
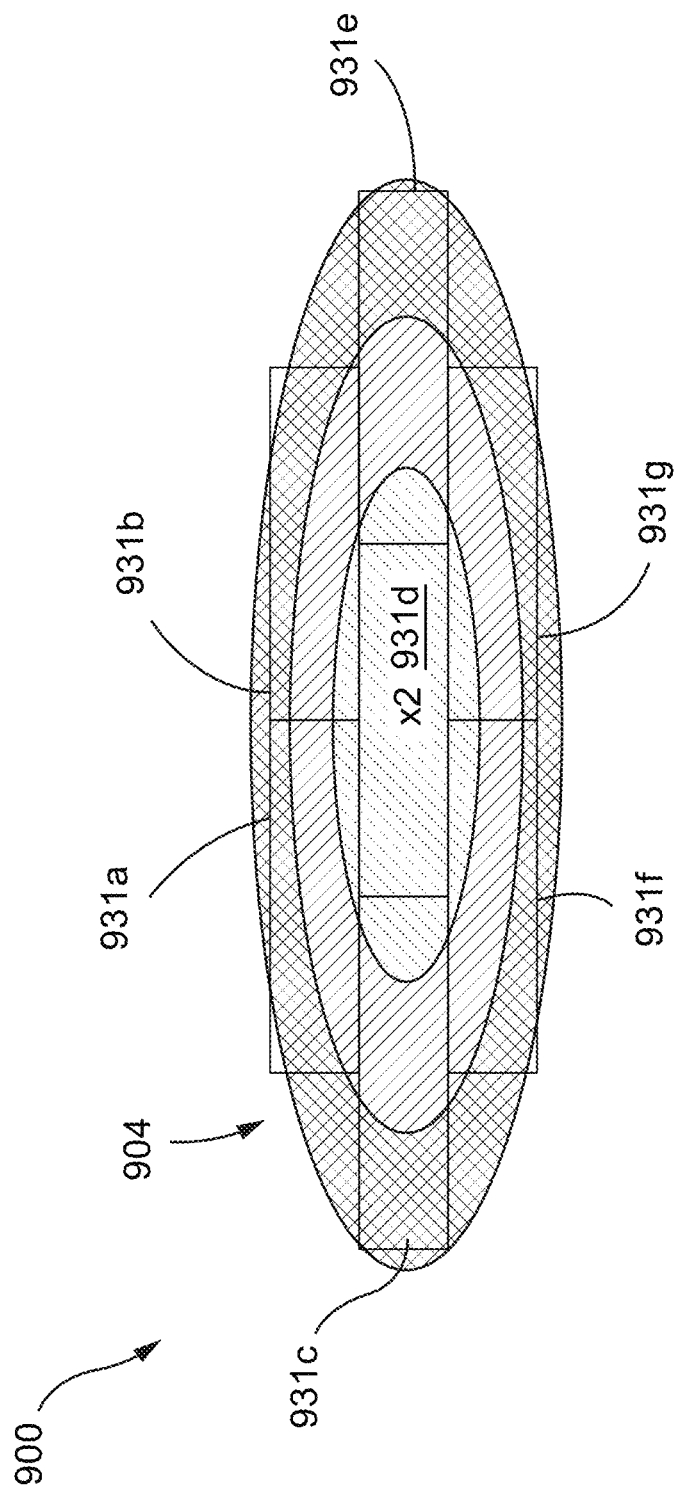
FIG. 9 shows an example of detector arrays that are tiled across a laser illumination pattern that has been imaged onto a focal plane like the focal plane in the LIDAR system shown in FIG. 1A.

FIG. 9 shows a sensor 900 that includes detector arrays 931a-931g (collectively, detector arrays 931) that are tiled across a laser illumination pattern 904 that has been imaged onto a focal plane. Compared to a system with a single detector array, the sensor FOV shown in FIG. 9 can be 3 times larger in each direction, allowing slower scan speeds. The center array outline is the through-hole in the splitting optic. Since the center of the laser beam typically has a high intensity, saturation effects in the center detector 931d array can be addressed by, for example, inserting a 50/50 beam splitter (not shown) in the collimated space between the refocusing optics to divide the light onto two detector arrays.

In one example, the refocusing optics 840a to 840c can have the same focal lengths (magnification). In another example, the focal lengths (magnifications) of the refocusing optics 840a-840c can be different, thereby allowing foveated imaging. For example, a central portion (e.g., 801a) of the FOV can be imaged at higher spatial resolution than outlying regions (e.g., 801b and 801c). This configuration can be helpful for actively illuminated scenes in which the center of the illumination beam is typically brighter than the edges, thereby producing higher signal rates.

In one example, different portions of the beams 801a to 801c are refocused onto detector arrays 820a to 820c. In another example, different portions of the beams 801a to 801c can be transmitted to various optical trains, such as beam splitters to spread light over multiple detector FPAs to avoid saturation, multi-spectral analyzers, polarimetric analyzers, and beam splitters to merge with a local oscillator for coherent detection, among others.

Data Processing Flow in LIDAR

Figure 10:
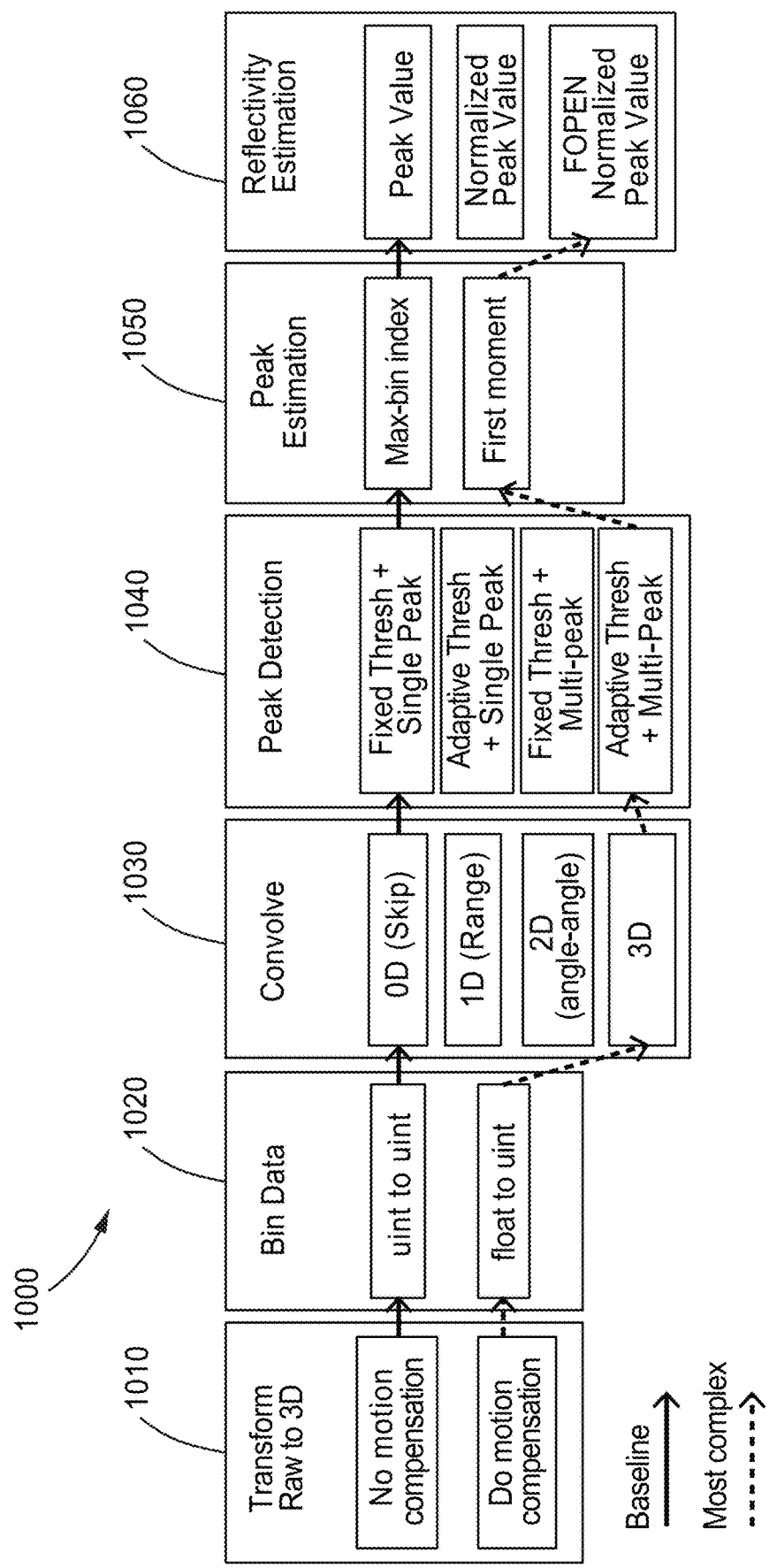
FIG. 10 illustrates a data flow for 3D imaging using a LIDAR system like the one shown in FIGS. 1A and 1B.

FIG. 10 illustrates a data processing flow for 3D imaging using a suitable processing system, such as a LIDAR system like the one shown in FIGS. 1A and 1B. Various modules can be used for various steps in the processing. The data processing flow 1000 shown in FIG. 10 includes six types of operations 1010, 1020, 1030, 1040, 1050, and 1060, which are typically linked together in a linear fashion. The choice of process used to accomplish each step can depend on the desired product quality, the anticipated signal level, the anticipated type of scene, the available computational resources, and the level of compression needed.

At step 1010 of the flow 1000, raw timing information is converted into a 3D coordinate system, which is the natural basis for scene geometry estimation. In one example, the processing system can assume static alignment during the burst interval, and index the cross-range coordinates by pixel row and column, and the line of sight distance (range) by clock counts of the timing logic. In another example, the processing system can account for relative motion between the sensor and correct for a linear (or higher order) time dependence in both range and cross-range offset when converting the raw timing information to the 3D coordinate system. These corrections can be based on an ancillary sensor inputs (inputs which can have lower accuracy requirements), or upon an iterative approach that can maximize image sharpness at later steps (such as 1020, 2040, 1050, 1060, etc.).

Step 1020 of the flow 1000 is to bin the photon detections into a 3D grid, forming a 3D histogram. Each photon detection can be attributed to a voxel. Alternatively, one detection may be partially attributed to multiple voxels so as to reduce 3D quantization artifacts. In one example, the processing system can input the row r, column c, and range bin b from step 1010 and increment the counter for the appropriate voxel (r, c, b). In another example, the processing system can convert fractional values (r, c, b) such as would be generated if a motion compensation process were used in step 1010. In yet another example, the processing system can increment a voxel counter by, for illustrative purposes only, 8 counts if the input (r, c, b) falls at the center of the voxel, but if the (r, c, b) is near the edge of a voxel the 8 counts would be distributed in a weighted fashion between multiple voxels. In this example, if the input (r, c, b) falls near the corner of a voxel, the eight nearest neighboring voxels would each be incremented by 1. This method can reduce spatial quantization effects at the expense of requiring 3 (i.e. $\log_2(8)$) more bits of resolution per voxel. In addition to histogramming photon detections, it can also be advantageous to use 3D histograms to tabulate a) the number of times a detector was looking through a voxel and could have fired; b) the dark-count or background-count rate of the pixels which looked through a voxel; c) the relative illumination intensity for the pixels which looked through a voxel.

After formation of the 3D histogram using photons detected during a burst of pulses, the next step 1030 passes a matched filter through the histogram. The objective is to optimize subsequent peak detection process 1040 when the system range and/or cross-range impulse response functions are non-Gaussian. In one example, this step 1030 can be optional (i.e., there can be no filtering). In another example, the processing system can use a 1D filter in the range direction. The range impulse response function can be skewed due to the non-symmetric laser pulse and/or the Geiger-mode detection physics. Alternatively, cross-range convolution might be used to correct a non-Gaussian optical point spread function, finite size effects of the detector pixels, cross-talk between detector pixels, etc. A full 3D point spread function might be used in the convolution step, incorporating the measured system response. The computation complexity of step 1030 can be weighed against the improvements achieved downstream in the peak-finding step 1040. In some cases the system SWaP cost of the additional computational complexity can be greater than the system SWaP cost of increased signal levels that might be achieved with, for example, a brighter laser, a larger aperture, or a longer integration time.

The peak detection step 1040 of the method 1000 identifies groups of photon detections within the 3D histogram that are statistically significant, and are likely not background noise. There can be a tradeoff between a high probability of detection and a low false-alarm rate. In general, tabulating more information in step 1020 (such as dark count probability, number of interrogations, illumination intensity) allows more advanced peak detection processes and better Receiver Operating Characteristic (ROC) performance (higher probability of detection at lower false alarm rates). In one example, a peak detector can look for the single largest peak in the range dimension that exceeds a fixed threshold value (number of detected photons). In another example, the processing system can look for multiple peaks in the range direction, identifying all that exceed a given threshold. In yet another example, the processing system can adjust the threshold in both the range and the cross-range direction, accommodating the varying number of interrogations, the varying pixel illumination, and the varying background count rate. Peak detectors might be optimized to find, for example, unobscured surfaces, unobscured linear features such as suspended wires, and partially-obscured objects.

Once significant peaks in the 3D histogram are identified, the Peak Estimation 1050 involves estimating the most likely 3D location of the object that gives rise to the peak. In one example, a group of histogram voxels in the immediate vicinity of the peak might be used to shift the reported coordinate of the peak away from the center of a voxel. This technique can improve the apparent flatness of planar surfaces and apparent linearity of linear features such as building edges and suspended wires. In another example, the processing system can simply report the indices of the 3D voxel containing the peak.

At optional step 1060, relative reflectivity of the object can be estimated. Reflectivity information can add to the interpretability of the imagery and can be useful when registering together the imagery from individual bursts of pulses (e.g., image chips). In one example, an estimate can be based on the occupation of the voxel identified as having a significant peak. Since the illumination typically may vary across the array, it can be helpful to normalize this raw photon count by the pixel illumination. When motion compensation is used in step 1010, there might be several pixels that interrogate a given scene voxel, and therefore the illumination factor for each of these pixels can be accounted. In the presence of partial obscurations, it can be helpful, when normalizing the photon count, to estimate the amount of illumination that is blocked by the obscurant, which is generally proportional to the obscuration fraction seen by each of the detector pixels. Without being bound by any particular theory or mode of operation, the number of photons detected in the canopy voxels is proportional to the product of the canopy reflectivity and the fractional obscuration. In order to estimate the fractional obscuration, a canopy reflectivity can be assumed based upon knowledge of the typical reflectivities of the types of obscurants in the scene.

In another example, an approach for achieving contrast in intensity images of partially-obscured scenes is to make repeated observations at various wavelengths or polarizations without varying the sensor-scene geometry. These multiple observations can be made through identical obscurations, so the fraction of light that is blocked can be common to the entire set of measurements. Intensity contrast images can be constructed by taking ratios of the return signal strength for the various measurements. If N measurements are collected (for example, if the scene is probed using light at 532 nm, 1064 nm, and 1540 nm, then N=3), then N−1 intensity images can be created. The three techniques (peak value, normalized peak value, and FOPEN normalized peak value) in 1060 represent just a few of the multiple approaches to estimating reflectivity. Taken together, the processing steps 1010 through 1060 comprise a powerful means to reduce the data storage volume and transmission bandwidth needed to communicate the salient features of the scene to subsequent processing and operator computers.

Examples of 3D Imaging

Figure 11A:
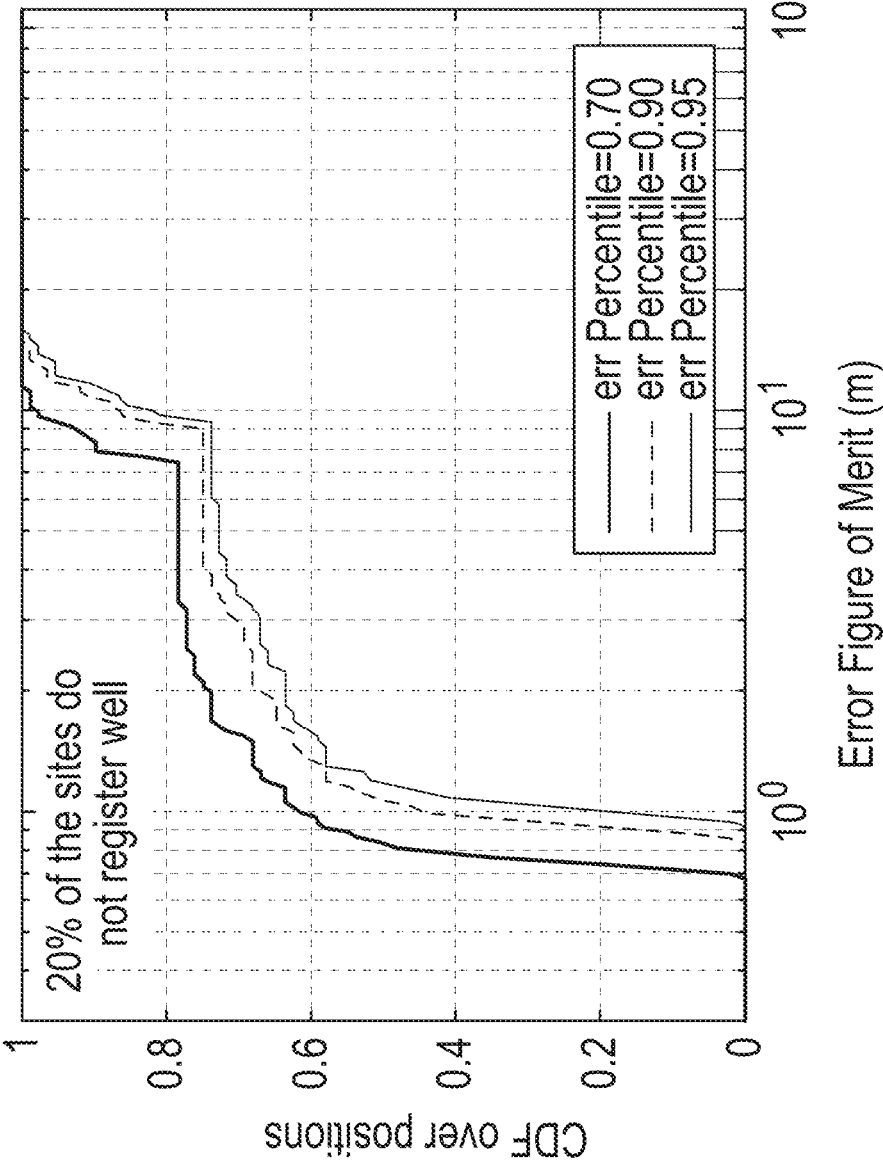

FIGS. 11A-11C show example results for coarse registration of images of respective 100 m² areas that overlap with neighboring areas by about 70% and that were acquired by an airborne LIDAR system like the one shown in FIG. 1A. In general, FIGS. 11A-11C show that techniques disclosed here can be promising to allow 3D image chips to be acquired without pointing knowledge, and to subsequently be stitched back together into a usable image.

The ability to register individual, small image chips into a large mosaic with sufficient image fidelity can be beneficial to the snapshot imaging concept. FIGS. 11A-11C show a 3D LIDAR dataset of a small urban area, processed with spatial resolution of 20 cm. Two chips of edge length L are excised out of the dataset, chosen to have an overlap area fraction f with each other. One of the chips is offset by a 3D vectors. It is then registered to the other chip using a coarse registration process based on spatial Fourier transforms for illustrating purposes only. In practice, a fine-resolution processes such as Iterative Closest Point (ICP), which can be reliable and convergent for small offsets, can be used. The process can be repeated for many offset vectors s, tabulating the accuracy of the coarse registration. The registration performance can be a weak function of the distance |s| up to the chip size L, as expected for this Fourier transform approach. The maximum residual uncorrected offset distance r can be determined for the 70th percentile, 90th percentile, and 95th percentile of the large number of random offsets s that were tested. The entire process is repeated for another pair of chips at a different location in the urban scene. Altogether 88 sites are studied on a grid that uniformly samples the urban scene, as depicted by the dots in the maps in FIGS. 11B and 11C. The sites include beaches, streets, buildings, and foliage. The results depicted in FIGS. 11A-11C are based on L=10 m (50 resolution elements) and f=0.7. 60% of the sites register to within about a meter whereas 20% do not register accurately. Most of these sites are in the beach area where the absence of 3D structure within the small image chips may explain the observation. Other sites with poor registration may have only a few edges or surfaces. Incorporation of intensity information within the registration process may improve the results at these anomalous sites.

CONCLUSION

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto; inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of designing and making the 3D imaging systems disclosed herein may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes (e.g., of designing and making the 3D imaging systems disclosed above) outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. An apparatus for generating a 3D image of a scene, the apparatus comprising:
   a light source to illuminate a first portion of the scene and a second portion of the scene with light pulses at a repetition rate greater than 10 kHz;
   a detector array to detect photons reflected or scattered by the first portion of the scene so as to generate a first detected data set representing respective arrival times and arrival angles of the photons reflected or scattered by the first portion of the scene and to detect photons reflected or scattered by the second portion of the scene so as to generate a second detected data set representing respective arrival times and arrival angles of the photons reflected or scattered by the second portion of the scene;
   an embedded processor, operably coupled to the detector array, to generate a first processed data set by removing at least one redundant data point and/or at least one noise data point from the first detected data set and to generate a second processed data set by removing at least one redundant data point and/or at least one noise data point from the second detected data set; and
   a processor, communicatively coupled to the embedded processor via a data link, to receive the first processed data set and the second processed data set and to generate the 3D image of the scene based on the first processed data set and the second processed data set.

2. The apparatus of claim 1, wherein the light source is an incoherent light source that emits pulses with durations of 0.1 ns to 15 ns.

3. The apparatus of claim 1, wherein the embedded processor is configured to remove the at least one redundant data point and/or at least one noise data point from the first detected data set via coincidence processing in an angle-angle range coordinate frame.

4. The apparatus of claim 1, wherein the detector array comprises an array of photon-counting detectors.

5. The apparatus of claim 1, wherein the embedded processor comprises at least one of a Field Programmable Gate Array (FPGA) or an Application Specific Integrated Circuit (ASIC).

6. The apparatus of claim 1, wherein the embedded processor is integrated with the detector array on a substrate.

7. The apparatus of claim 1, wherein the processor is further configured to estimate a property of a surface of the scene based on the first processed data set, the property of the surface comprising at least one of a location, a size, a reflectivity, a polarization characteristic, or a motion.

8. The apparatus of claim 1, further comprising:
   a read-out integrated circuit (ROIC), operably coupling the embedded processor to the detector array, to read out photocurrent generated by the detector array, time stamp photon arrivals detected by the detector array, and/or read out pixel locations of the photons detected by the detector array.

9. The apparatus of claim 1, further comprising:
   a wireless link between the embedded processor and the processor to convey the processed data set from the embedded processor to the processor.

10. A method of generating a representation of a scene, the method comprising:
   A) illuminating a first portion of the scene with at least one first light pulse;
   B) acquiring at least one first raw point cloud from photons reflected or scattered from the first portion of the scene using a focal plane array, a first data point in the at least one first raw point cloud representing a first distance between the focal plane array and a first scene point in the first portion of the scene;
   C) removing, with a first processor, at least one of a first noise data point or a first redundant data point from the at least one first raw point cloud so as to generate a first processed point cloud having fewer data points than the at least one first raw point cloud;
   D) conveying the first processed point cloud to a second processor;
   E) illuminating a second portion of the scene with a second light pulse;
   F) acquiring a second raw point cloud from photons reflected or scattered from the second portion of the scene using the focal plan array, a second data point in the second raw point cloud representing a second distance between the focal plane array and a second scene point in the second portion of the scene;
   G) removing, with the first processor, at least one of a second noise data point or a second redundant data point from the second raw point cloud so as to generate a second processed point cloud having fewer data points than the second raw point cloud;
   H) conveying the second processed point cloud to the second processor; and
   I) generating, using the second processor, a three-dimensional image of the scene based at least in part on the first processed point cloud and the second processed point cloud.

11. The method of claim 10, wherein the first processed point cloud comprises a single range value.

12. The method of claim 10, wherein A) comprises illuminating the first portion of the scene with a first plurality of light pulses, B) comprises acquiring a first plurality of raw point clouds from the photons reflected or scattered from the first portion of the scene using the focal plane array, and C) comprises generating the first processed point cloud based on the first plurality of raw point clouds via coincidence processing in an angle-angle range coordinate frame.

13. The method of claim 10, wherein B) comprises acquiring the at least one first raw point cloud using a single photon detector.

14. The method of claim 10, wherein B) comprises acquiring the at least one first raw point cloud using a Geiger-mode avalanche photodiode.

15. The method of claim 10, wherein C) comprises generating the first processed point cloud with at least one of a Field Programmable Gate Array (FPGA) or an Application Specific Integrated Circuit (ASIC).

16. The method of claim 10, wherein C) further comprises:
  estimating a property of a surface of the first portion of the scene, the property of the surface comprising at least one of a location, a size, a reflectivity, a polarization characteristic, and a motion.

17. The method of claim 10, wherein the first noise data point originates from dark current in the focal plane array and C) comprises removing the first noise data point from the at least one first raw point cloud.

18. The method of claim 10, wherein the at least one first raw point cloud has at least about 10 times as many data points as the first processed point cloud.

* * * * *